(12) United States Patent
Ikriannikov

(10) Patent No.: US 8,952,776 B2
(45) Date of Patent: Feb. 10, 2015

(54) POWDER CORE MATERIAL COUPLED INDUCTORS AND ASSOCIATED METHODS

(75) Inventor: Alexandr Ikriannikov, Castro Valley, CA (US)

(73) Assignee: Volterra Semiconductor Corporation, San Jose, CA (US)

( * ) Notice: Subject to any disclaimer, the term of this patent is extended or adjusted under 35 U.S.C. 154(b) by 38 days.

(21) Appl. No.: 13/107,616

(22) Filed: May 13, 2011

(65) Prior Publication Data

US 2011/0279100 A1 Nov. 17, 2011

Related U.S. Application Data

(60) Continuation-in-part of application No. 13/024,280, filed on Feb. 9, 2011, now Pat. No. 8,416,043, which is a continuation-in-part of application No. 12/786,301, filed on May 24, 2010, and a continuation-in-part of (Continued)

(51) Int. Cl.
| | |
|---|---|
| H01F 27/02 | (2006.01) |
| H01F 27/29 | (2006.01) |
| H01F 5/00 | (2006.01) |
| H01F 17/04 | (2006.01) |
| H01F 27/28 | (2006.01) |
| H01F 27/24 | (2006.01) |
| H02M 7/00 | (2006.01) |

(52) U.S. Cl.
CPC ................................. H02M 7/003 (2013.01)
USPC ............. 336/83; 336/192; 336/200; 336/221; 336/222; 336/233

(58) Field of Classification Search
USPC ............................ 336/83, 192, 200, 222, 221
See application file for complete search history.

(56) References Cited

U.S. PATENT DOCUMENTS

| | | |
|---|---|---|
| 3,448,421 A | 6/1969 | Berg et al. |
| 3,574,685 A | 4/1971 | Haines |
| 4,543,554 A | 9/1985 | Muellenheim et al. |
| 4,636,752 A | 1/1987 | Saito |
| 5,023,578 A | 6/1991 | Kaneko et al. |
| 5,123,989 A | 6/1992 | Horiishi et al. |

(Continued)

FOREIGN PATENT DOCUMENTS

| | | |
|---|---|---|
| EP | 1 632 964 | 3/2006 |
| EP | 1 833 165 | 9/2007 |

(Continued)

OTHER PUBLICATIONS

Office Action issued in U.S. Appl. 12/786,301, Jun. 22, 2012.

(Continued)

*Primary Examiner* — Tsz Chan
(74) *Attorney, Agent, or Firm* — Lathrop & Gage LLP

(57) ABSTRACT

A multi-phase coupled inductor includes a powder core material magnetic core and first, second, third, and fourth terminals. The coupled inductor further includes a first winding at least partially embedded in the core and a second winding at least partially embedded in the core. The first winding is electrically coupled between the first and second terminals, and the second winding electrically is coupled between the third and fourth terminals. The second winding is at least partially physically separated from the first winding within the magnetic core. The multi-phase coupled inductor is, for example, used in a power supply.

23 Claims, 24 Drawing Sheets

Related U.S. Application Data application No. 12/404,993, filed on Mar. 16, 2009, now Pat. No. 8,294,544, and a continuation-in-part of application No. 12/830,849, filed on Jul. 6, 2010, now Pat. No. 8,237,530, which is a continuation-in-part of application No. 12/538,707, filed on Aug. 10, 2009, now Pat. No. 8,102,233, and a continuation-in-part of application No. 12/271,497, filed on Nov. 14, 2008, now Pat. No. 7,965,165, which is a continuation-in-part of application No. 11/929,827, filed on Oct. 30, 2007, now Pat. No. 7,498,920, which is a continuation-in-part of application No. 11/852,207, filed on Sep. 7, 2007, now abandoned, which is a division of application No. 10/318,896, filed on Dec. 13, 2002, now Pat. No. 7,352,269, which is a continuation-in-part of application No. PCT/US2008/081886, filed on Oct. 30, 2008.

(60) Provisional application No. 61/036,836, filed on Mar. 14, 2008, provisional application No. 61/046,736, filed on Apr. 21, 2008.

(56) References Cited

U.S. PATENT DOCUMENTS

| | | |
|---|---|---|
| 5,353,001 A | 10/1994 | Meinel et al. |
| 5,469,334 A | 11/1995 | Balakrishnan |
| 5,565,837 A | 10/1996 | Godek et al. |
| 5,568,111 A | 10/1996 | Metsler |
| 5,574,420 A | 11/1996 | Roy et al. |
| 5,631,822 A | 5/1997 | Silberkleit et al. |
| 5,939,966 A | 8/1999 | Shin'Ei |
| 6,060,977 A | 5/2000 | Yamamoto et al. |
| 6,114,932 A | 9/2000 | Wester et al. |
| 6,198,375 B1 | 3/2001 | Shafer |
| 6,204,744 B1 | 3/2001 | Shafer et al. |
| 6,342,778 B1 | 1/2002 | Catalano et al. |
| 6,362,986 B1 | 3/2002 | Schultz et al. |
| 6,377,155 B1 | 4/2002 | Allen et al. |
| 6,388,896 B1 | 5/2002 | Cuk |
| 6,420,953 B1 | 7/2002 | Dadafshar |
| 6,449,829 B1 | 9/2002 | Shafer |
| 6,460,244 B1 | 10/2002 | Shafer et al. |
| 6,549,111 B1 | 4/2003 | De Graaf et al. |
| 6,578,253 B1 | 6/2003 | Herbert |
| 6,765,468 B2 | 7/2004 | Chen et al. |
| 6,791,444 B1 | 9/2004 | Masuda et al. |
| 6,867,678 B2 | 3/2005 | Yang |
| 6,885,274 B2 * | 4/2005 | Hsu et al. ............... 336/192 |
| 6,980,077 B1 | 12/2005 | Chandrasekaran et al. |
| 7,034,645 B2 | 4/2006 | Shafer et al. |
| 7,187,263 B2 | 3/2007 | Vinciarelli |
| 7,259,648 B2 | 8/2007 | Matsutani et al. |
| 7,280,025 B2 | 10/2007 | Sano |
| 7,292,128 B2 | 11/2007 | Hanley |
| 7,425,883 B2 | 9/2008 | Matsutani et al. |
| 7,498,920 B2 | 3/2009 | Sullivan et al. |
| 7,525,406 B1 | 4/2009 | Cheng |
| 2002/0067234 A1 | 6/2002 | Kung |
| 2002/0093413 A1 | 7/2002 | Shin'ei |
| 2004/0017276 A1 | 1/2004 | Chen et al. |
| 2004/0113741 A1 * | 6/2004 | Li et al. ............ 336/212 |
| 2004/0125628 A1 * | 7/2004 | Yamada et al. .......... 363/177 |
| 2005/0024179 A1 | 2/2005 | Chandrasekaran et al. |
| 2005/0128040 A1 | 6/2005 | Gray et al. |
| 2006/0044101 A1 | 3/2006 | Frutschy et al. |
| 2006/0049907 A1 | 3/2006 | Liu |
| 2006/0089022 A1 * | 4/2006 | Sano ............................ 439/79 |
| 2006/0145804 A1 * | 7/2006 | Matsutani et al. ............ 336/200 |
| 2006/0158297 A1 | 7/2006 | Sutardja |
| 2007/0262840 A1 * | 11/2007 | Matsutani et al. ............... 336/12 |
| 2008/0012674 A1 | 1/2008 | Sano et al. |
| 2008/0024259 A1 | 1/2008 | Chandrasekaran et al. |
| 2008/0136576 A1 | 6/2008 | Emmons et al. |
| 2008/0150666 A1 | 6/2008 | Chandrasekaran et al. |
| 2008/0211613 A1 | 9/2008 | Lin et al. |
| 2008/0303624 A1 | 12/2008 | Yamada et al. |
| 2009/0040000 A1 | 2/2009 | Hopper et al. |
| 2009/0179723 A1 | 7/2009 | Ikriannikov et al. |
| 2009/0231081 A1 | 9/2009 | Ikriannikov et al. |
| 2009/0237197 A1 | 9/2009 | Ikriannikov et al. |
| 2010/0007453 A1 * | 1/2010 | Yan et al. ................. 336/90 |
| 2010/0007457 A1 | 1/2010 | Yan et al. |
| 2010/0013587 A1 * | 1/2010 | Yan et al. .................. 336/192 |
| 2010/0271161 A1 | 10/2010 | Yan et al. |
| 2012/0056704 A1 | 3/2012 | Nagano et al. |

FOREIGN PATENT DOCUMENTS

| JP | 2000-164431 | 6/2000 |
| JP | 2005310865 | 11/2005 |
| JP | 2005310865 A * | 11/2005 |
| WO | WO 2006/026674 | 3/2006 |
| WO | WO2009059069 A2 | 5/2009 |

OTHER PUBLICATIONS

International Search Report and Written Opinion issued in PCT Patent Application PCT/US11/37751, Aug. 21, 2012.
Office Action issued in U.S. Appl. No. 13/024,280, Jun. 26, 2012.
Response to Office Action issued in U.S. Appl. No. 13/024,280, Oct. 25, 2012.
Chandrasekaran, S. et al., "Integrated Magnetics for Interleaved DC-DC Boost for Fuel Cell Powered Vehicles," 35th Annual IEEE Power Electronics Specialists Conferences, 356-61 (2004).
Cooper Bussmann, "Product Data Sheet for Low Profile Inductor (Surface Mount)" retrieved from http://www.angliac.com, May 2003.
Micrometals, Inc., Composite Cores parts listing, 1 page, accessed via the Internet at http://www.micrometals.com/pcparts/ccore.html on Dec. 18, 2007.
Panasonic, Power Choke Coil, 2 pages, Jan. 2008.
Pulse, SMT Power Inductors datasheet, 2 pages, Nov. 2007.
Pulse Product News Press Release dated Nov. 25, 2008.
Pulse, SMT Power Inductors Power Beads—PA0766NL Series; pp. 53-55; Mar. 2006.
TSC Pyroferric Composite Toroid datasheet, 1 page, accessed via the Internet at http://www.tscinternational.net/comptoroidprint.pdf on Dec. 18, 2007.
Vishay, Low Profile, High Current IHLP Inductor, 3 pages, Jan. 21, 2009.
U.S. Appl. No. 13/024,280, Notice of Allowance mailed Dec. 10, 2012, 7 pages.
U.S. Appl. No. 13/024,280, Issue Fee Payment, filed Mar. 11, 2013, 2 pages.
U.S. Appl. No. 12/786,301, Response to Non-Final Rejection, filed Dec. 18, 2012, 12 pages.
U.S. Appl. No. 12/786,301, Final Rejection mailed Apr. 12, 2013, 14 pages.

* cited by examiner

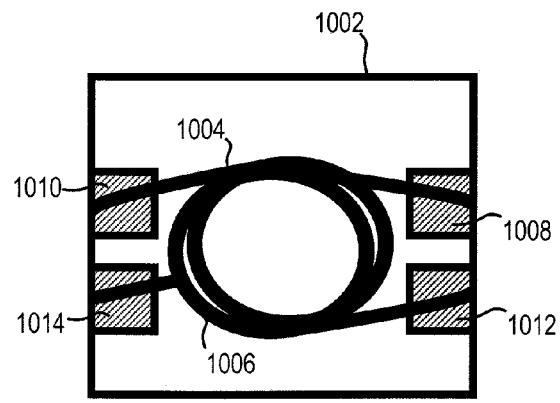
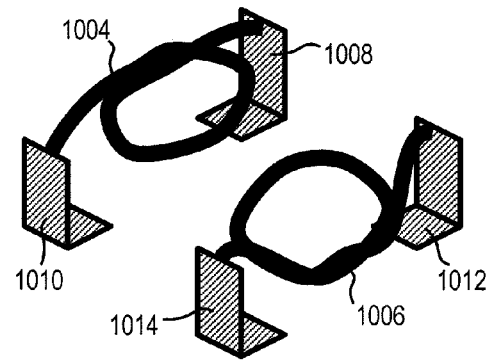
FIG. 11
FIG. 12
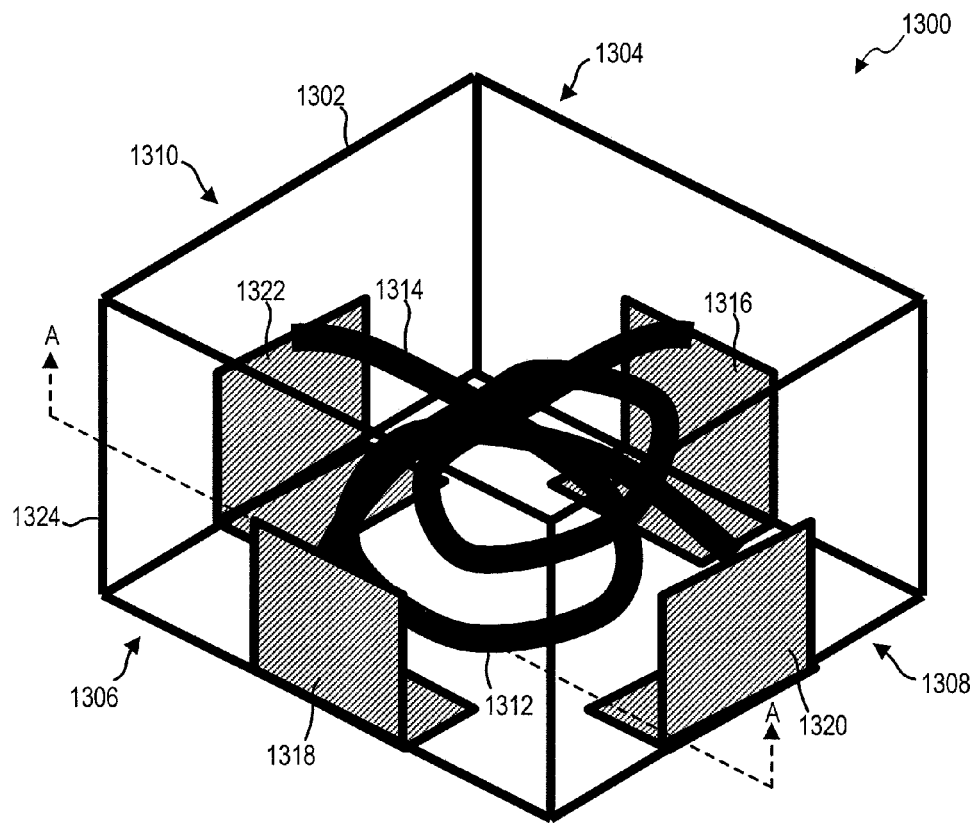
FIG. 13

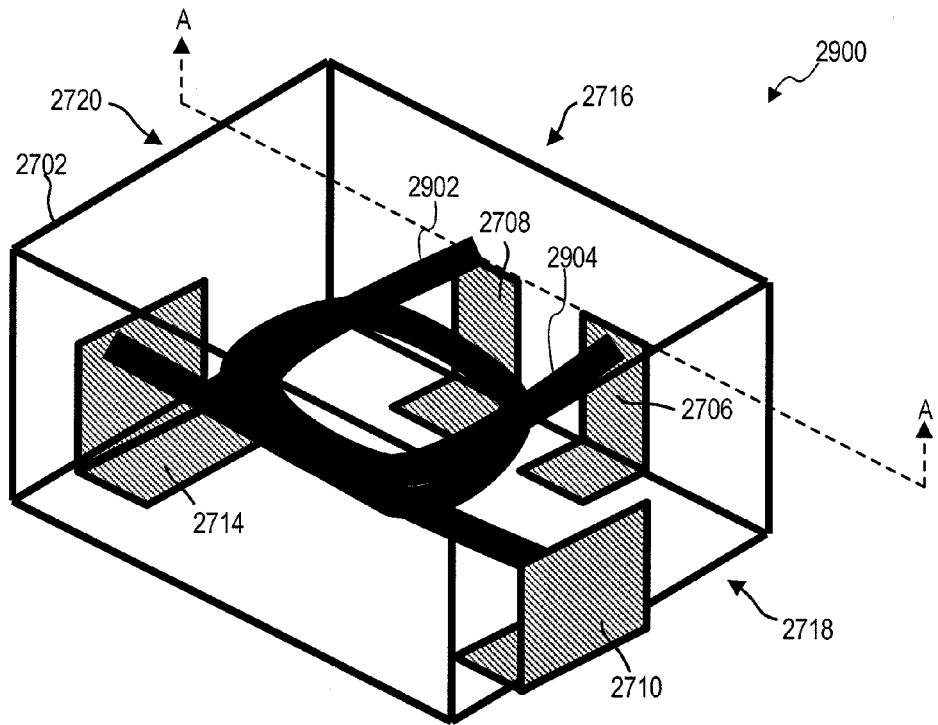
FIG. 29
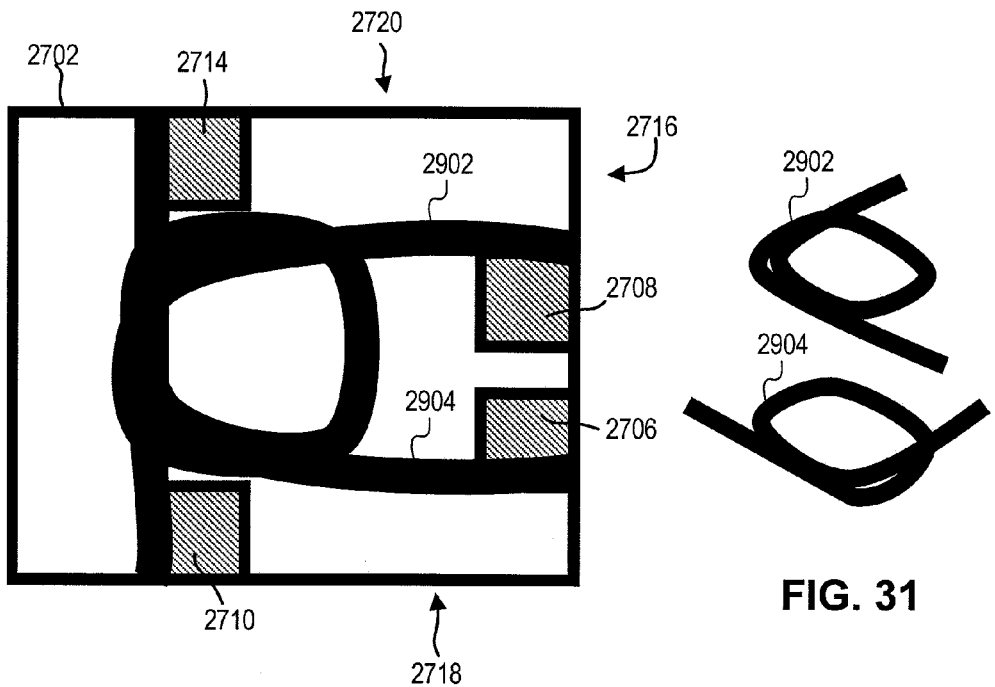
FIG. 30
FIG. 31

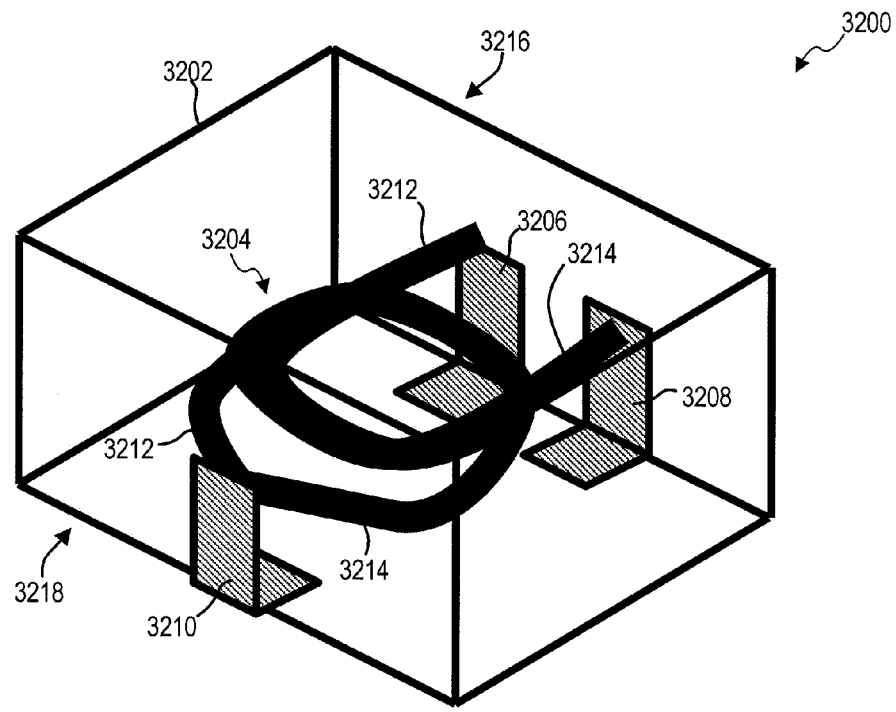
FIG. 32
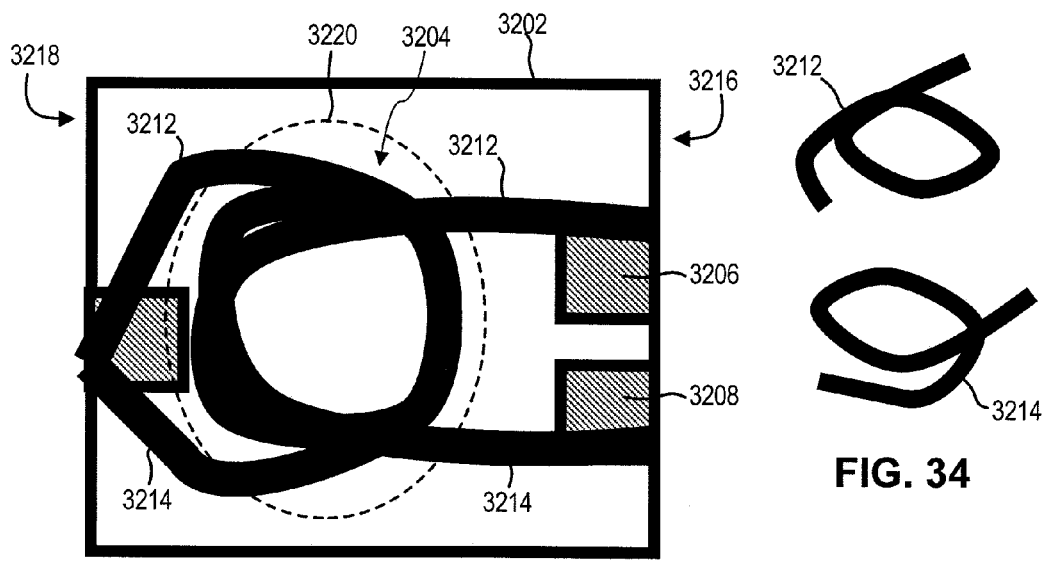
FIG. 33
FIG. 34

POWDER CORE MATERIAL COUPLED INDUCTORS AND ASSOCIATED METHODS

RELATED APPLICATIONS

This application is a continuation in part of U.S. patent application Ser. No. 13/024,280 filed Feb. 9, 2011 now U.S. Pat. No. 8,416,043, which is a continuation in part of U.S. patent application Ser. No. 12/786,301 filed May 24, 2010. This application is also a continuation in part of U.S. patent application Ser. No. 12/404,993 filed Mar. 16, 2009 now U.S. Pat. No. 8,294,544, which claims benefit of priority to U.S. Provisional Patent Application Ser. No. 61/036,836 filed Mar. 14, 2008 and to U.S. Provisional Patent Application Ser. No. 61/046,736 filed Apr. 21, 2008. This application is also a continuation in part of U.S. patent application Ser. No. 12/830,849 filed Jul. 6, 2010 now U.S. Pat. No. 8,237,530, which is a continuation in part of U.S. patent application Ser. No. 12/538,707 filed Aug. 10, 2009 now U.S. Pat. No. 8,102,233. This application is also a continuation in part of U.S. patent application Ser. No. 12/271,497 filed Nov. 14, 2008 now U.S. Pat. No. 7,965,165, which is a continuation in part of U.S. patent application Ser. No. 11/929,827 filed Oct. 30, 2007 (now U.S. Pat. No. 7,498,920), which is a continuation in part of U.S. patent application Ser. No. 11/852,207 filed Sep. 7, 2007 (now abandoned), which is a divisional of U.S. patent application Ser. No. 10/318,896 filed Dec. 13, 2002 (now U.S. Pat. No. 7,352,269). U.S. patent application Ser. No. 12/271,497 is also a continuation of Patent Cooperation Treaty Patent Application No. PCT/US08/81886 filed Oct. 30, 2008, which claims benefit of priority to U.S. patent application Ser. No. 11/929,827 filed Oct. 30, 2007 and to U.S. Provisional Patent Application Ser. No. 61/036,836 filed Mar. 14, 2008. U.S. patent application Ser. No. 12/271,497 also claims benefit of priority to U.S. Provisional Patent Application Ser. No. 61/036,836 filed Mar. 14, 2008. Each of the above-mentioned applications is incorporated herein by reference.

BACKGROUND

Switching DC-to-DC converters having a multi-phase coupled-inductor topology are described in U.S. Pat. No. 6,362,986 to Schultz et al., the disclosure of which is incorporated herein by reference. These converters have advantages, including reduced ripple current in the inductors and the switches, which enables reduced per-phase inductance and/or reduced switching frequency over converters having conventional multi-phase DC-to-DC converter topologies. As a result, DC-to-DC converters with magnetically coupled inductors achieve a superior transient response without an efficiency penalty when compared to conventional multiphase topologies. This allows a significant reduction in output capacitance resulting in smaller, lower cost solutions.

Various coupled inductors have been developed for use in multi-phase DC-to-DC converters applications. Examples of prior coupled inductors may be found in U.S. Pat. No. 7,498,920 to Sullivan et al., the disclosure of which is incorporated herein by reference.

SUMMARY

In an embodiment, a coupled inductor includes a magnetic core formed of a powder magnetic material and first, second, third, and fourth terminals. The coupled inductor further includes a first and a second winding, each at least partially embedded in the magnetic core. The first winding is electrically coupled between the first and second terminals, and the second winding is electrically coupled between the third and fourth terminals. The second winding is at least partially physically separated from the first winding within the magnetic core.

In an embodiment, a power supply includes a printed circuit board, a coupled inductor affixed to the printed circuit board, and a first and a second switching circuit affixed to the printed circuit board. The coupled inductor includes a magnetic core formed of a powder magnetic material and first, second, third, and fourth terminals. The coupled inductor further includes a first winding at least partially embedded in the magnetic core and a second winding at least partially embedded in the magnetic core. The first winding is electrically connected between the first and second terminals, and the second winding is electrically connected between the third and fourth terminals. The second winding is at least partially physically separated from the first winding within the magnetic core. The first switching circuit is electrically coupled to the first terminal and configured to switch the first terminal between at least two different voltage levels. The second switching circuit is electrically coupled to the third terminal and configured to switch the third terminal between at least two different voltage levels. The second and fourth terminals are electrically connected together.

In an embodiment, a method for forming a coupled inductor includes (1) positioning a plurality of windings such that each winding of the plurality of windings is at least partially physically separated from each other winding of the plurality of windings, (2) forming a powder magnetic material at least partially around the plurality of windings, and (3) curing a binder of the powder magnetic material.

In an embodiment, a method for forming a coupled inductor includes (1) positioning a plurality of windings in a mold such that each winding of the plurality of windings is at least partially physically separated from each other winding of the plurality of windings, (2) disposing a powder magnetic material in the mold, and (3) curing a binder of the powder magnetic material.

In an embodiment, a coupled inductor includes N windings and a monolithic magnetic core formed of a powder magnetic material, where N is an integer greater than one. The monolithic magnetic core includes first and second end magnetic elements and N legs connecting the first and second end magnetic elements. Each of the N windings is wound around a respective one of the N legs.

In an embodiment, a power supply includes a coupled inductor and N switching circuits, where N is an integer greater than one. The coupled inductor includes N windings and a monolithic magnetic core formed of a powder magnetic material. The monolithic magnetic core includes first and second end magnetic elements and N legs connecting the first and second end magnetic elements. Each of the N windings is wound around a respective one of the N legs. Each of the N switching circuits is for switching a second end of a respective one of the N windings between at least two different voltage levels at a frequency of at least 20 kilohertz.

In an embodiment, a coupled inductor includes a monolithic magnetic core formed of a powder magnetic material and N windings each at least partially embedded in the monolithic magnetic core. The N windings are at least partially physically separated from each other in the monolithic magnetic core. The monolithic magnetic core magnetically couples the N windings and provides a path for leakage magnetic flux contributing to leakage inductance associated with the N windings. N is an integer greater than one.

In an embodiment, a power supply includes a coupled inductor and N switching circuits, where N is an integer greater than one. The coupled inductor includes a monolithic magnetic core formed of a powder magnetic material and N windings each at least partially embedded in the monolithic magnetic core. The N windings are at least partially physically separated from each other in the monolithic magnetic core. The monolithic magnetic core magnetically couples the N windings and provides a path for leakage magnetic flux contributing to leakage inductance associated with the N windings. Each winding has a first end electrically coupled to a common node. Each switching circuit is for switching a second end of a respective one of the N windings between at least two different voltage levels at a frequency of at least 20 kilohertz.

BRIEF DESCRIPTION OF DRAWINGS

FIG. 10 shows a perspective view and FIG. 11 shows a top cross sectional view of another two phase coupled inductor, according to an embodiment.

FIG. 12 shows a perspective view of the windings of the coupled inductor of FIGS. 10 and 11 separated from a magnetic core of the inductor.

FIG. 13 shows a perspective view and FIG. 14 shows a top cross sectional view of another two phase coupled inductor, according to an embodiment.

FIG. 29 shows a perspective view and FIG. 30 shows a top cross sectional view of another two phase coupled inductor, according to an embodiment.

FIG. 31 shows a perspective view of the windings of the coupled inductor of FIGS. 29 and 30.

FIG. 32 shows a perspective view and FIG. 33 shows a top cross sectional view of another two phase coupled inductor, according to an embodiment.

FIG. 34 shows a perspective view of the windings of the coupled inductor of FIGS. 32 and 33.

DETAILED DESCRIPTION OF THE EMBODIMENTS

Figure 1:
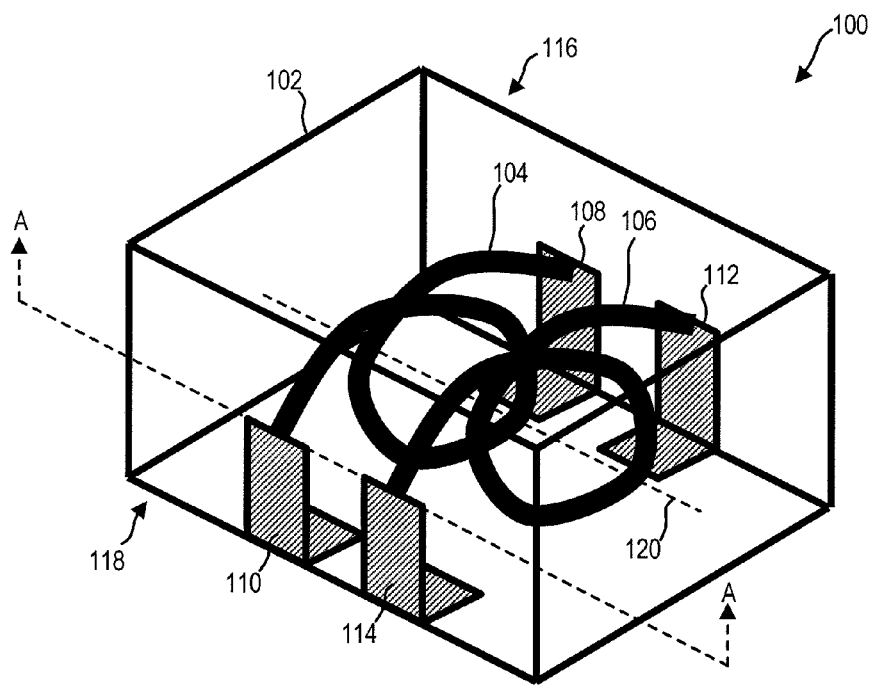
FIG. 1 shows a perspective view and FIG. 2 shows a top cross sectional view of a two phase coupled inductor, according to an embodiment.

Disclosed herein, among other things, are coupled inductors that significantly advance the state of the art. In contrast to prior coupled inductors, certain embodiments of the coupled inductors disclosed herein include two or more windings at least partially embedded in a magnetic core formed of a powder magnetic material, such as powdered iron within a binder. Such coupled inductors may have one or more desirable features, as discussed below. It the following disclosure, specific instances of an item may be referred to by use of a numeral in parentheses (e.g., switching node 416(1)) while numerals without parentheses refer to any such item (e.g., switching nodes 416). For purposes of illustrative clarity, certain elements in the drawings may not be drawn to scale.

Figure 2:
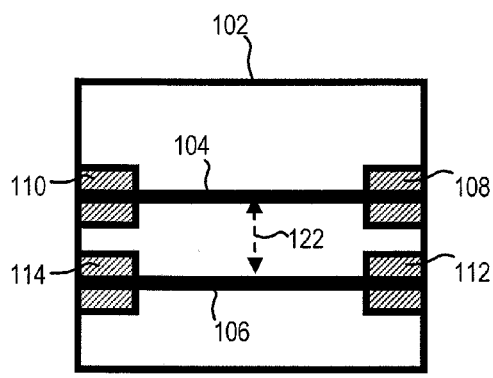

FIG. 1 shows one example of a coupled inductor including two or more windings at least partially embedded in a magnetic core formed of a powder magnetic material. Specifically, FIG. 1 shows a perspective view of coupled inductor 100, and FIG. 2 shows a cross sectional view of coupled inductor 100 taken along line A-A of FIG. 1. Inductor 100 includes a magnetic core 102, windings 104, 106, and electrical terminals 108, 110, 112, 114. Core 102, which is shown as transparent in FIG. 1, includes a first side 116 and an opposite second side 118. Core 102 is formed of powder magnetic material, such as powdered iron within a binder, and provides a path for magnetic flux to magnetically couple together windings 104, 106. Windings 104, 106 each form at least one turn and are at least partially embedded in core 102. Typically, windings 104, 106 are mostly or completely embedded in core 102 to promote strong magnetic coupling between windings 104, 106 and to promote mechanical robustness of coupled inductor 100.

Figure 3:
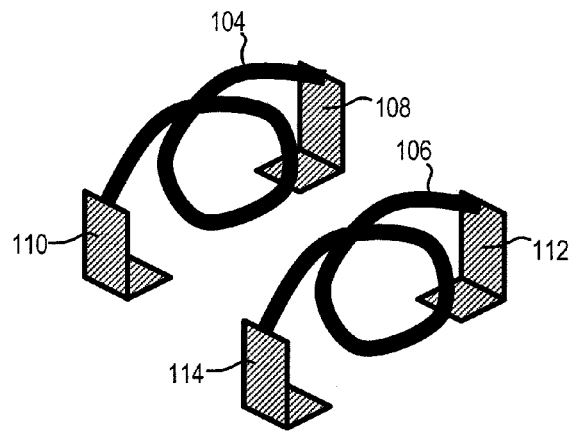
FIG. 3 shows a perspective view of the windings of the coupled inductor of FIGS. 1 and 2 separated from a magnetic core of the inductor.

Winding 104 is electrically coupled between terminals 108, 110, and winding 106 is electrically coupled between terminals 112, 114. Thus, terminals 108, 110 provide electrical interface to winding 104, and terminals 112, 114 provide electrical interface to winding 106. Terminals 108, 112 are disposed proximate to first side 116, and terminals 110, 114 are disposed proximate to second side 118. Terminals 108, 110, 112, 114 may be in form of solder tabs as shown in FIGS. 1-3 such that coupled inductor 100 is suitable for surface mount soldering to a printed circuit board (PCB). Such solder tabs, for example, are discrete components connected (e.g., welded or soldered) to the windings. However, the solder tabs could alternately be formed from the windings themselves, such as by pressing winding ends to form solder tabs. Terminals 108, 110, 112, 114 may also have forms other than solder tabs, such as through-hole pins for soldering to plated PCB through holes.

In certain embodiments, windings 104, 106 are aligned such that they form at least one turn along a common axis 120, which promotes strong magnetic coupling between windings 104, 106. Common axis 120 is, for example, disposed in a horizontal plane of core 102, as shown in FIG. 1. Windings 104, 106 are, for example, formed of wire or foil. FIG. 3 shows a perspective view of windings 104, 106 separate from core 102.

Windings 104, 106 are at least partially separated from each other within core 102 to provide a path for leakage magnetic flux and thereby create leakage inductance when coupled inductor 100 is connected to a circuit. As it is known in the art, coupled inductors must have a sufficiently large leakage inductance in DC-to-DC converter applications to limit ripple current magnitude. In the example of FIGS. 1 and 2, windings 104, 106 are horizontally separated from each other and are completely physically separated from each other by a separation distance 122 (see FIG. 2). Leakage inductance is proportional to separation 122 between windings 104, 106, and leakage inductance can therefore be varied during the design of coupled inductor 100 by varying separation distance 122. Leakage inductance is also inversely proportional to a magnetic permeability of the powder magnetic material of core 102, and leakage inductance can thus be adjusted during the design of coupled inductor 100 by varying the composition of the material forming core 102. In certain embodiments, at least some of the powder core magnetic material between windings 104, 106 has a different composition, such as a different magnetic characteristic, than the power core magnetic material forming other portions of core 102. Such feature may be used, for example, to control separation of windings 104, 106 during core 102's manufacturing, and/or to control magnetic permeability of core 102 in an area between windings 104, 106.

Figure 4:
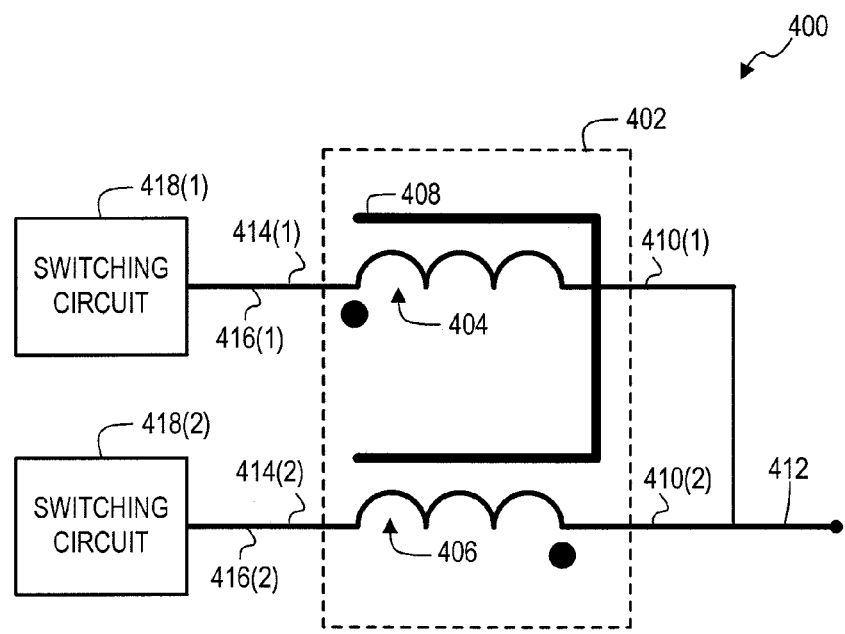
FIG. 4 shows a schematic of a DC-to-DC converter.

As known in the art, coupled inductor windings must be inversely magnetically coupled to realize the advantages discussed above of coupled inductors over multiple discrete inductors in a multiphase DC-to-DC converter. Inverse magnetic coupling in a two-phase DC-to-DC converter 400 application can be appreciated with reference to FIG. 4. DC-to-DC converter 400 includes a coupled inductor 402, having two windings 404, 406, and a magnetic core 408 magnetically coupling the windings 404, 406. A first end 410 of each winding 404, 406 electrically couples to a common node 412, and a second end 414 of each winding 404, 406 electrically couples to a respective switching node 416. A respective switching circuit 418 is also electrically coupled to each switching node 416. Each switching circuit 418 switches its respective second end 414 between at least two different voltage levels. DC-to-DC converter 400, for example, may be configured as a buck converter where switching circuits 418 switch their respective second end 414 between an input voltage and ground, and common node 412 is an output node. In another exemplary embodiment, DC-to-DC converter 400 is configured as a boost converter, where each switching circuit 418 switches its second end 414 between an output node and ground, and common node 412 is an input node.

Coupled inductor 402 is configured such at it has inverse magnetic coupling between windings 404, 406. As a result of such inverse magnetic coupling, an increasing current flowing through winding 404 from switching node 416(1) to common node 412 induces an increasing current flowing through winding 406 from switching node 416(2) to common node 412. Similarly, an increasing current flowing through winding 406 from switching node 416(2) to common node 412 induces an increasing current in winding 404 flowing from switching node 416(1) to common node 412, because of the inverse coupling.

In coupled inductor 100 of FIGS. 1 and 2, windings 104, 106 are configured in core 102 such that an increasing current flowing through winding 104 from first terminal 108 to second terminal 110 induces an increasing current flowing through winding 106 from fourth terminal 114 to third terminal 112. As result, inverse coupling is achieved in coupled inductor 100 in DC-to-DC converter applications when either first and fourth terminals 108, 114 or second and third terminals 110, 112 are connected to respective switching nodes. Accordingly, the two terminals of coupled inductor 100 connected to switching nodes in DC-to-DC converter applications must each be on opposite sides of core 102 to realize inverse magnetic coupling.

Figure 5:
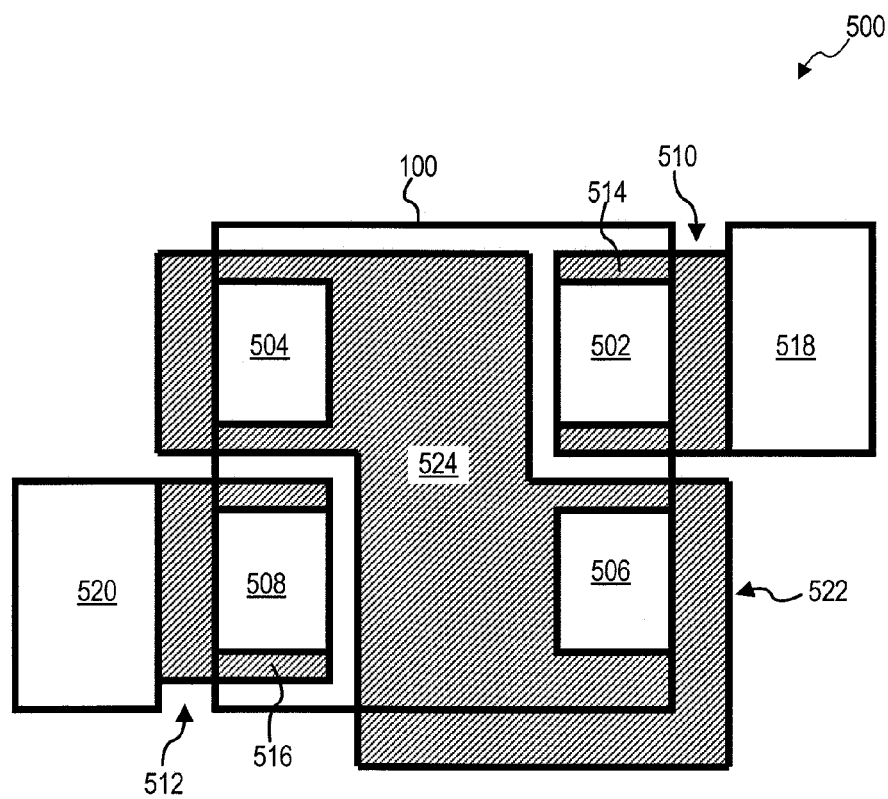
FIG. 5 shows one printed circuit board layout that may be used with certain embodiments of the coupled inductor of FIGS. 1 and 2 in a DC-to-DC converter application.

FIG. 5 shows one PCB layout 500 for use with certain embodiments of coupled inductor 100 in a DC-to-DC converter application. Layout 500 includes pads 502, 504, 506, 508 for respectively coupling to terminals 108, 110, 112, 114 of coupled inductor 100. Pads 502, 508 are respectively coupled to switching nodes 510 and 512 via conductive traces 514, 516, and switching circuits 518, 520 are respectively coupled to switching nodes 510 and 512 via conductive traces 514, 516. Pads 504, 506 connect to a common node 522 via conductive trace 524. Only the outline of coupled inductor 100 is shown in FIG. 5 to show details of layout 500. In certain embodiments, layout 500 forms part of a buck converter where common node 522 is an output node and switching circuits 518, 520 respectively switch switching nodes 510, 512 between an input voltage and ground.

As discussed above, terminals of coupled inductor 100 that are connected to switching nodes are disposed on opposite sides of core 102 to achieve inverse magnetic coupling. Thus, switching node pads 502, 508 are also disposed on opposite sides of coupled inductor 100. Switching circuits 518, 520 are also disposed on opposite sides of coupled inductor 100 in layout 500 because, as know in the art, switching circuits are preferably located near their respective inductor terminals for efficient and reliable DC-to-DC converter operation.

Figure 6:
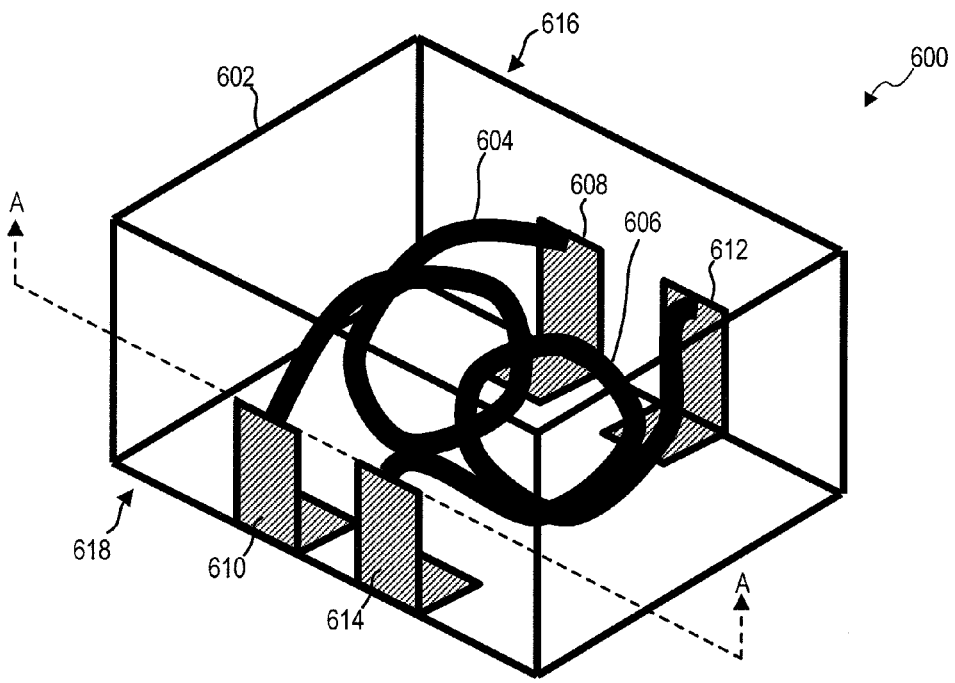
FIG. 6 shows a perspective view and FIG. 7 shows a top cross sectional view of another two phase coupled inductor, according to an embodiment.
Figure 7:
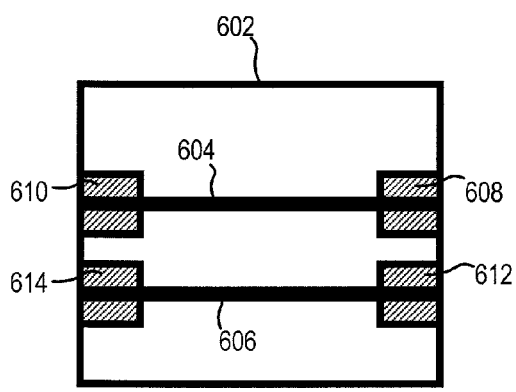
Figure 8:
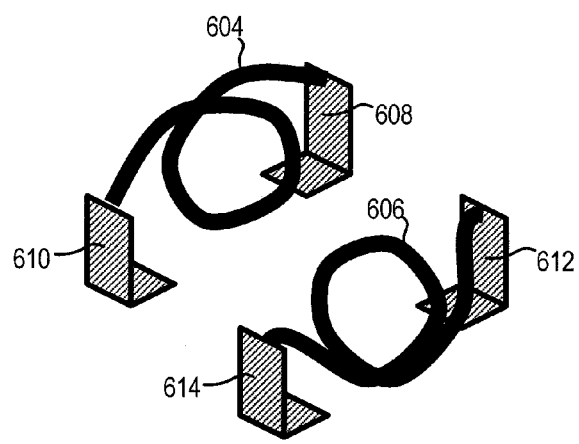
FIG. 8 shows a perspective view of the windings of the coupled inductor of FIGS. 6 and 7 separated from a magnetic core of the inductor.

FIG. 6 shows a perspective view of another coupled inductor 600, and FIG. 7 shows a cross sectional view of coupled inductor 600 taken along line A-A of FIG. 6. Coupled inductor 600 is similar to coupled inductor 100 of FIG. 1 but has a different winding configuration than coupled inductor 100. Coupled inductor 600 includes a magnetic core 602 (shown as transparent in FIG. 6) formed of a powder magnetic material, such as powdered iron within a binder, windings 604, 606, and electrical terminals 608, 610, 612, 614. Terminals 608, 612 are disposed proximate to a first side 616 of core 602, and terminals 610, 614 are disposed proximate to an opposite second side 618 of core 602. Winding 604 is electrically coupled between terminals 608, 610, and winding 606 is electrically coupled between terminals 612, 614. FIG. 8 shows a perspective view of windings 604, 606 separated from core 602.

Figure 9:
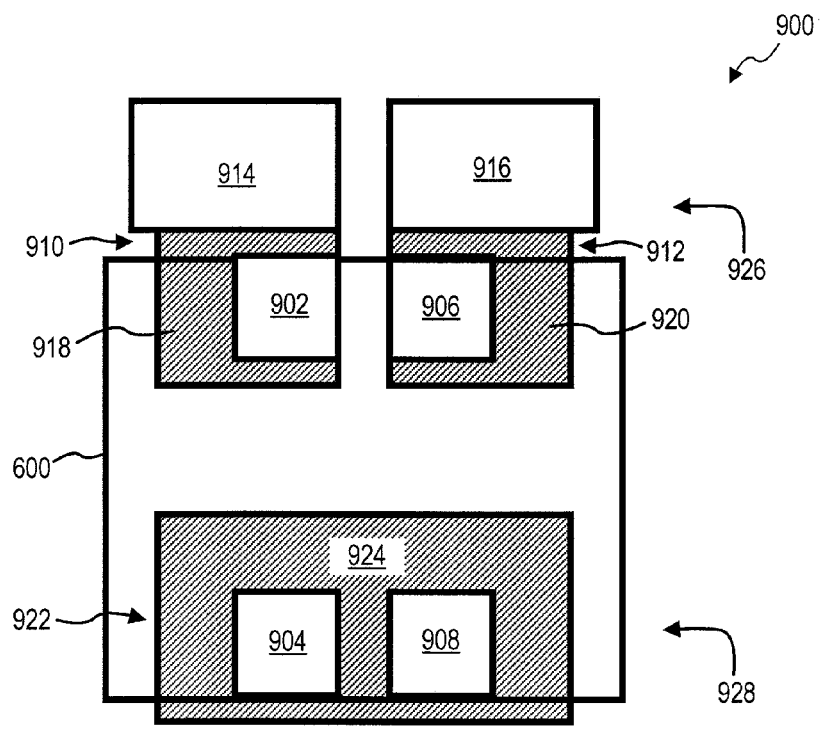
FIG. 9 shows one printed circuit board layout that may be used with certain embodiments of the coupled inductor of FIGS. 6 and 7 in a DC-to-DC converter application.

Windings 604, 606 are configured in core 602 such that an increasing electric current flowing through winding 604 from a first terminal 608 to a second terminal 610 induces an increasing electric current in winding 606 flowing from third terminal 612 to fourth terminal 614. Accordingly, in contrast to coupled inductor 100 of FIG. 1, inverse magnetic coupling is achieved with coupled inductor 600 when terminals on a same side of core 602 are connected to respective switching nodes. For example, FIG. 9 shows one PCB layout 900, which may be used with certain embodiments of coupled inductor 600 in a DC-to-DC converter application. Only the outline of coupled inductor 600 is shown in FIG. 9 to show details of layout 900. Layout 900 includes pads 902, 904, 906, 908 for respectively electrically coupling to terminals 608, 610, 612, 614 of coupled inductor 600. Each of pads 902, 906 electrically couples to a respective switching node 910, 912 and a respective switching circuit 914, 916 via a respective conductive trace 918, 920. Each of pads 904, 908 electrically couples to a common node 922 via a conductive trace 924. In certain embodiments, layout 900 forms part of a buck converter where common node 922 is an output node, and switching circuits 914, 916 respectively switch switching nodes 910, 912 between an input voltage and ground.

Due to inverse magnetic coupling being achieved when terminals on a common side of core 602 are electrically coupled to respective switching nodes, each of switching pads 902, 906 are disposed on a common side 926 of coupled inductor 600 in layout 900. Such feature allows each switching circuit 914, 916 to also be disposed on common side 926, which, for example, promotes ease of PCB layout and may enable use of a common heat sink for the one or more switching devices (e.g., transistors) of each switching circuit 914, 916. Additionally, each of common node pads 904, 908 are also disposed on a common side 928 in layout 900, thereby enabling common node trace 924 to be short and wide, which promotes low impedance and ease of PCB layout. Accordingly, the winding configuration of coupled inductor 600 may be preferable to that of coupled inductor 100 in certain applications.

Figure 10:
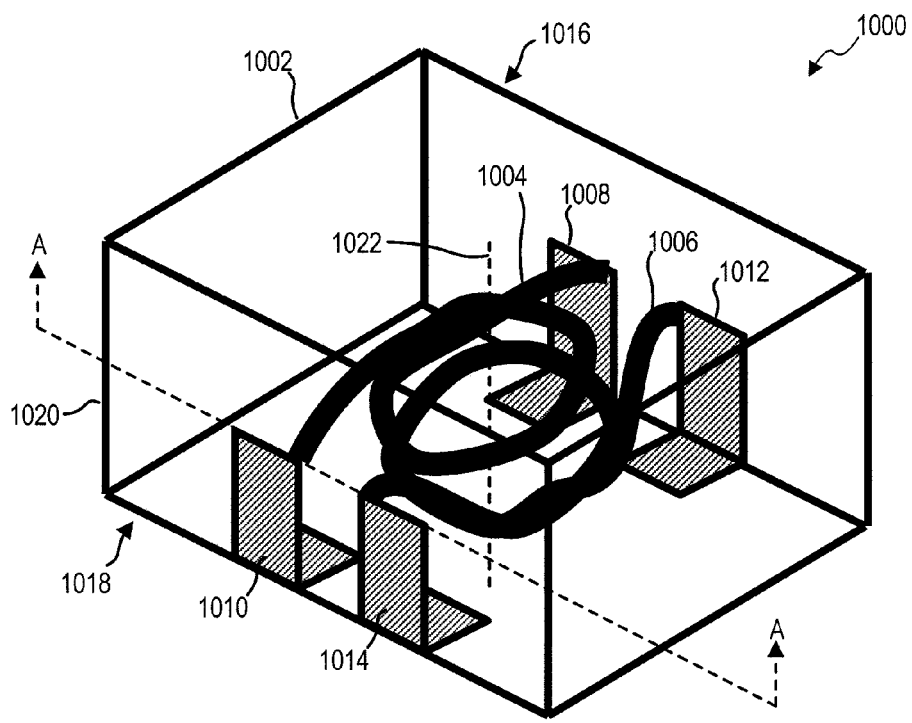

FIG. 10 shows perspective view of another coupled inductor 1000, which is similar to coupled inductor 100, but has a different winding configuration. Coupled inductor 1000 includes a core 1002, shown as transparent in FIG. 10, formed of a powder magnetic material, such as powdered iron within a binder. Coupled inductor 1000 further includes windings 1004, 1006 at least partially embedded in core 1002 and electrical terminals 1008, 1010, 1012, 1014. Winding 1004 is electrically coupled between terminals 1008, 1010, and winding 1006 is electrically coupled between terminals 1012, 1014. Terminals 1008, 1012 are disposed proximate to a first side 1016 of core 1002, and terminals 1010, 1014 are disposed proximate to a second side 1018 of core 1002. FIG. 11 shows a cross sectional view of coupled inductor 1000 taken along line A-A of FIG. 10, and FIG. 12 shows a perspective view of windings 1004, 1006 separated from core 1002.

In contrast to coupled inductors 100 and 600 of FIGS. 1 and 6 respectively, windings 1004, 1006 are vertically displaced from each other in core 1002—that is, windings 1004, 1006 are displaced from each other along a vertical axis 1020. In certain embodiments, windings 1004, 1006 form at least one turn around a common axis 1022 to promote strong magnetic coupling between windings 1004, 1006. Axis 1022 is, for example, disposed in a vertical plane in core 1002 or parallel to vertical axis 1020, as shown in FIG. 10. Similar to coupled inductors 100 and 600, leakage inductance of coupled inductor 1000 when installed in a circuit is proportional to physical separation between windings 1004, 1006. Windings 1004, 1006 are configured in core 1002 such that an increasing current flowing through winding 1004 from first terminal 1008 to second terminal 1010 induces an increasing current through winding 1006 from third terminal 1012 to fourth terminal 1014. Thus, inverse magnetic coupling is achieved with coupled inductor 1000 in DC-to-DC converter applications when either terminals 1008, 1012 or 1010, 1014 are electrically coupled to respective switching nodes. Accordingly, certain embodiments of coupled inductor 1000 can be used with layout 900 of FIG. 9.

Figure 14:
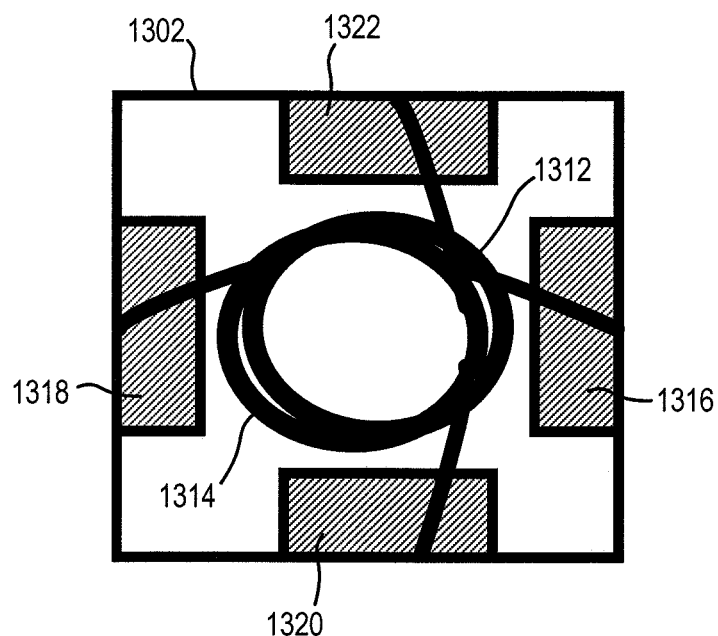

FIGS. 13-14 show yet another variation of coupled inductor 100. Specifically, FIG. 13 shows a perspective view of one coupled inductor 1300, and FIG. 14 shows a cross sectional view of coupled inductor 1300 taken along line A-A of FIG. 13. Coupled inductor 1300 is similar to coupled inductor 100, but includes a different winding configuration. Coupled inductor 1300 includes a core 1302, shown as transparent in FIG. 13, which is formed of a powder magnetic material, such as powdered iron within a binder. Core 1302 includes first side 1304, second side 1306, third side 1308, and fourth side 1310. First side 1304 is opposite of second side 1306, and third side 1308 is opposite of fourth side 1310.

Figure 15:
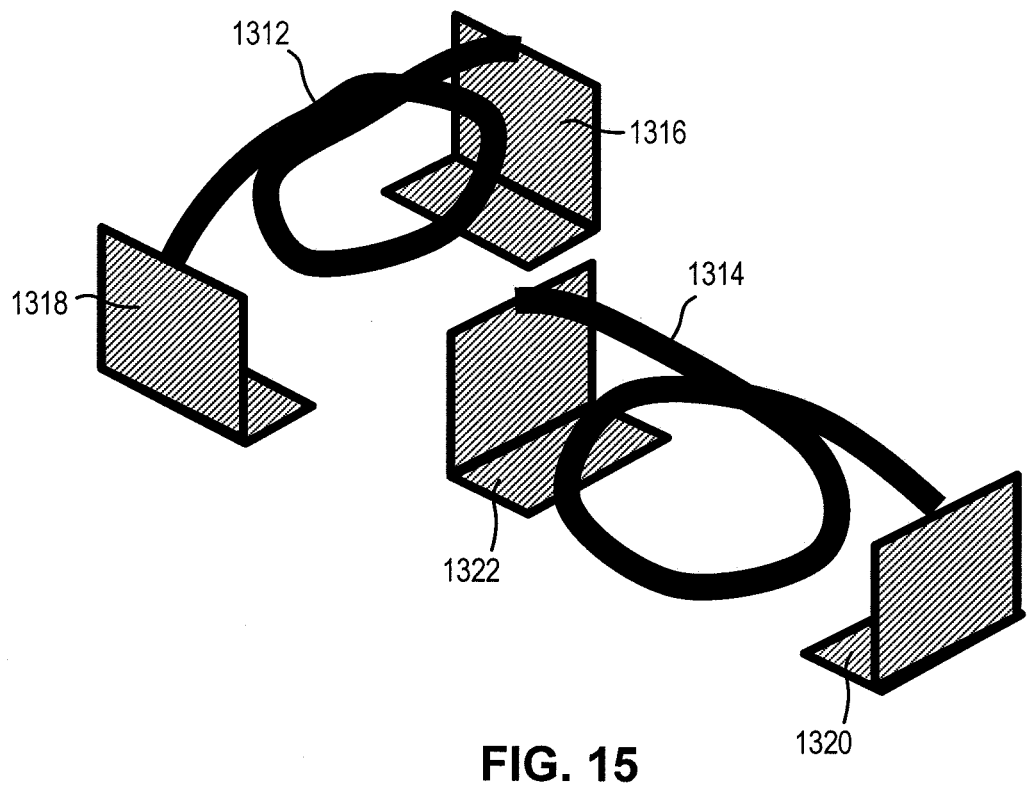
FIG. 15 shows a perspective view of the windings of the coupled inductor of FIGS. 13 and 14 separated from a magnetic core of the inductor.

Coupled inductor 1300 further includes windings 1312, 1314 and electrical terminals 1316, 1318, 1320, 1322. Terminal 1316 is disposed proximate to first side 1304 of core 1302, terminal 1318 is disposed proximate to second side 1306 of core 1302, terminal 1320 is disposed proximate to third side 1308 of core 1302, and terminal 1322 is disposed proximate to fourth side 1310 of core 1302. Winding 1312 is electrically coupled between first and second terminals 1316, 1318, and winding 1314 is electrically coupled between third and fourth terminals 1320, 1322. Windings 1312, 1314 are at least partially embedded in magnetic core 1302, and similar to coupled inductor 1000, windings 1312, 1314 are vertically displaced from each other along a vertical axis 1324. FIG. 15 shows a perspective view of windings 1312, 1314 separated from core 1302.

An increasing current flowing through winding 1312 from first terminal 1316 to second terminal 1318 induces an increasing current in winding 1314 flowing from third terminal 1320 to fourth terminal 1322. Accordingly, inverse magnetic coupling between windings 1312, 1314 in a DC-to-DC converter application can be achieved, for example, with either first and third terminals 1316, 1320, or second and fourth terminals 1318, 1322, electrically coupled to respective switching nodes.

Figure 16:
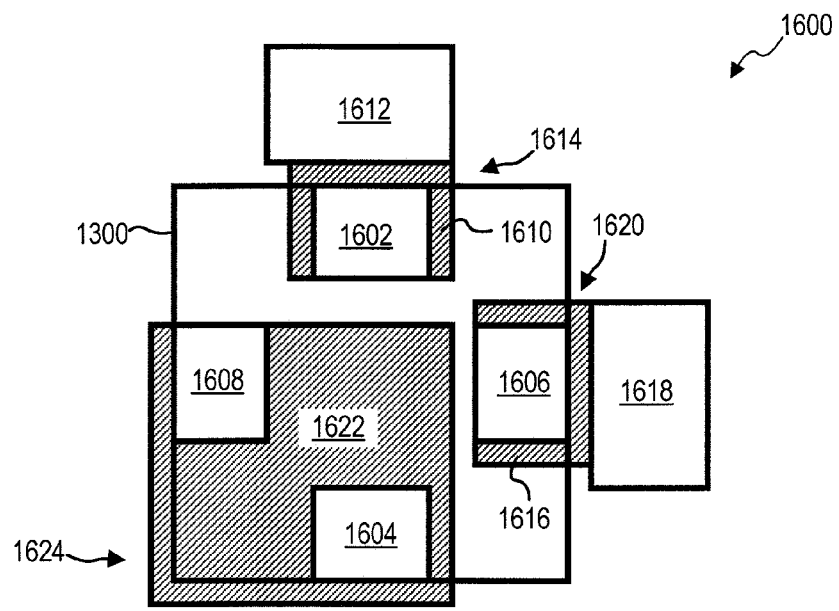
FIG. 16 shows one printed circuit board layout that may be used with certain embodiments of the coupled inductor of FIGS. 13 and 14 in a DC-to-DC converter application.

For example, FIG. 16 shows one PCB layout 1600, which is one example of a PCB layout that may be used with certain embodiments of coupled inductor 1300 in a DC-to-DC converter application. Layout 1600 includes pads 1602, 1604, 1606, 1608 for respectively coupling to terminals 1316, 1318, 1320, 1322 of coupled inductor 1300. Only the outline of coupled inductor 1300 is shown in FIG. 16 to show the pads of layout 1600. A conductive trace 1610 connects pad 1602 and a switching circuit 1612 to a first switching node 1614, and a conductive trace 1616 connects pad 1606 and a switching circuit 1618 to a second switching node 1620. A conductive trace 1622 connects pads 1604, 1608 to a common node 1624. It should be noted that conductive trace 1622 is short and wide in layout 1600, thereby promoting low impedance on common node 1624. In certain embodiments, layout 1600 forms part of a buck converter where common node 1624 is an output node, and switching circuits 1612, 1618 respectively switch switching nodes 1614, 1620 between an input voltage and ground.

Figure 17:
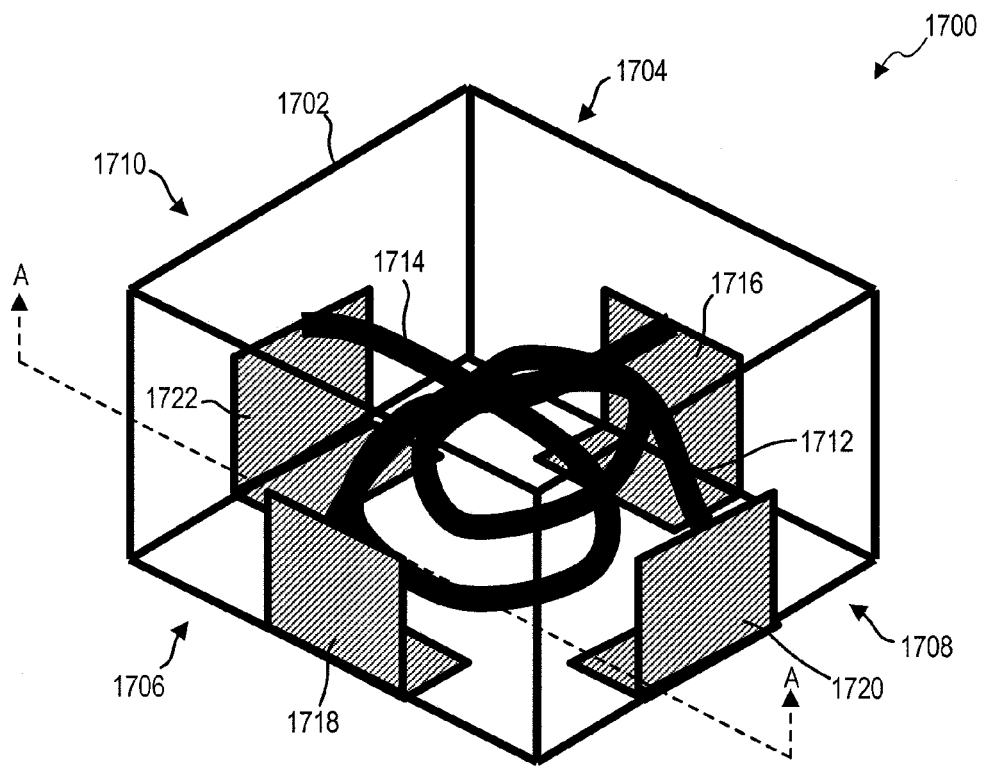
FIG. 17 shows a perspective view and FIG. 18 shows a top cross sectional view of another two phase coupled inductor, according to an embodiment.
Figure 18:
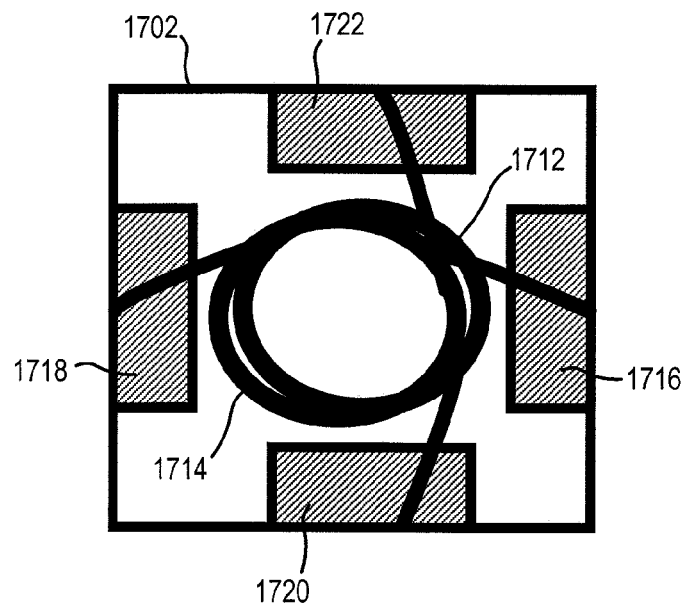

FIG. 17 shows a perspective view of another coupled inductor 1700, and FIG. 18 shows a cross sectional view of inductor 1700 taken along line A-A of FIG. 17. Coupled inductor 1700 is similar to coupled inductor 1300 of FIG. 13, but with a different winding configuration. Coupled inductor 1700 includes a magnetic core 1702 formed of a powder magnetic material, such as powdered iron within a binder. Core 1702 is shown as transparent in FIG. 17, and core 1702 includes a first side 1704, a second side 1706, a third side 1708, and a fourth side 1710.

Figure 19:
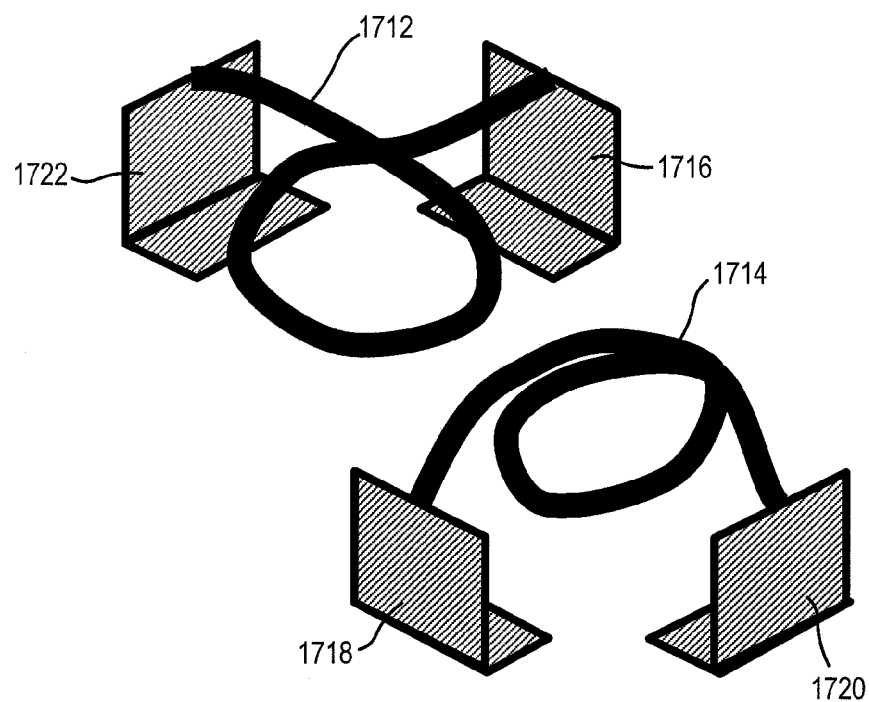
FIG. 19 shows a perspective view of the windings of the coupled inductor of FIGS. 17 and 18 separated from a magnetic core of the inductor.

Coupled inductor 1700 further includes windings 1712, 1714, and terminals 1716, 1718, 1720, 1722. Terminal 1716 is disposed proximate to first side 1704, terminal 1718 is disposed proximate to second side 1706, terminal 1720 is disposed proximate to third side 1708, and terminal 1722 is disposed proximate to fourth side 1710. Winding 1712 is electrically coupled between first and fourth terminals 1716, 1722, and winding 1714 is electrically coupled between second and third terminals 1718, 1720. FIG. 19 shows a perspective view of windings 1712, 1714 separated from core 1702.

An increasing electric current flowing through winding 1712 from fourth terminal 1722 to first terminal 1716 induces an increasing current flowing through winding 1714 flowing from third terminal 1720 to second terminal 1718. Accordingly, inverse magnetic coupling is achieved in DC-to-DC converter applications when either first and second terminals 1716, 1718 or third and fourth terminals 1720, 1722 are electrically coupled to respective switching nodes.

Figure 20:
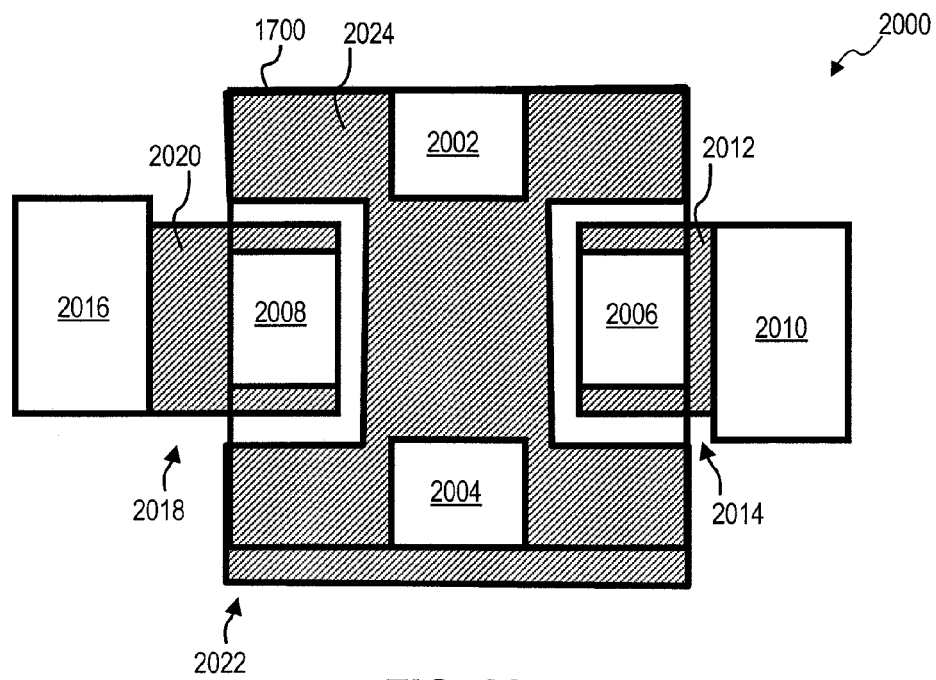
FIG. 20 shows one printed circuit board layout that may be used with certain embodiments of the coupled inductor of FIGS. 17 and 18 in a DC-to-DC converter application.

FIG. 20 shows one layout 2000 that may be used with certain embodiments of coupled inductor 1700 in a DC-to-DC converter application. Layout 2000 includes first, second, third, and fourth solder pads 2002, 2004, 2006, 2008 for respectively coupling to terminals 1716, 1718, 1720, 1722 of coupled inductor 1700. Pad 2006 and a switching circuit 2010 connect to first switching node 2012 via a conductive trace 2014, and pad 2008 and a second switching circuit 2016 connect to a second switching node 2018 via a conductive trace 2020. Pads 2002, 2004 are electrically coupled to common output node 2022 via a conductive trace 2024. Only the outline of coupled inductor 1700 is shown in FIG. 20 to show the pads of layout 2000.

Figure 21:
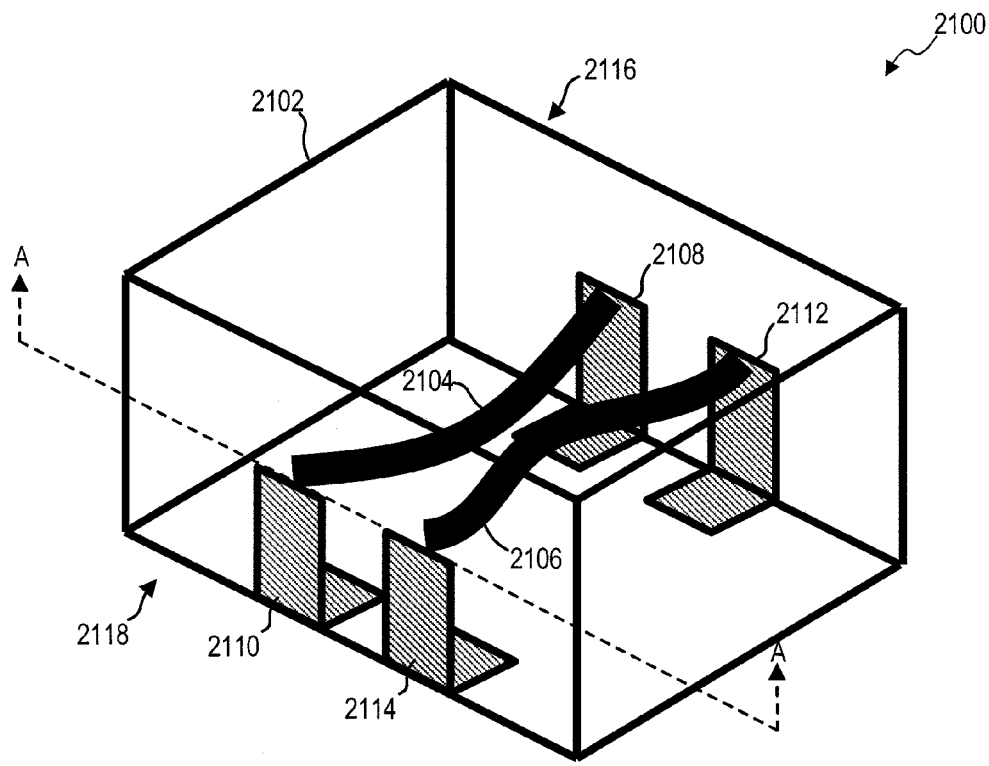
FIG. 21 shows a perspective view and FIG. 22 shows a top cross sectional view of another two phase coupled inductor, according to an embodiment.
Figure 22:
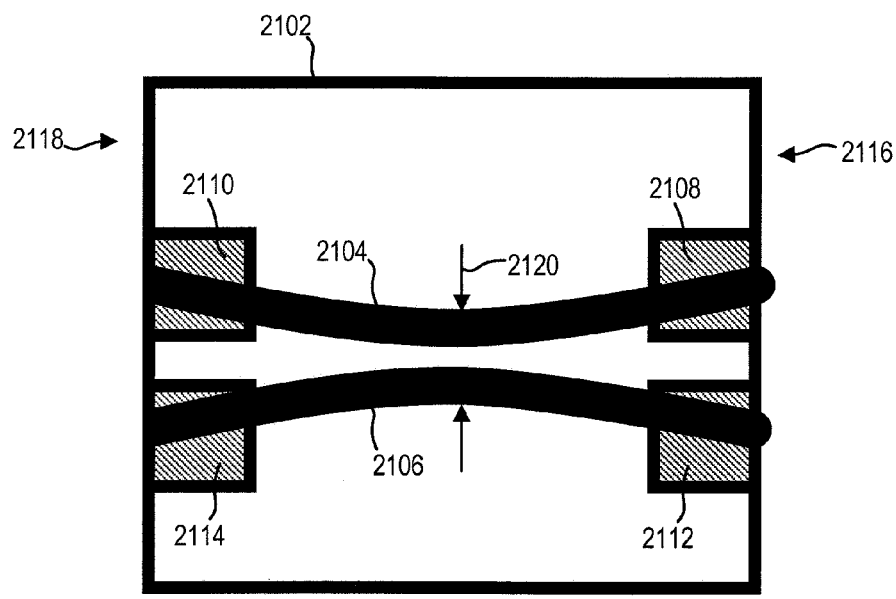

FIG. 21 shows a perspective view of one coupled inductor 2100, and FIG. 22 shows a cross sectional view of coupled inductor 2100 taken along line A-A of FIG. 21. Coupled inductor 2100 is similar to coupled inductor 100 (FIG. 1), but includes "staple" style windings. Coupled inductor 2100 includes a magnetic core 2102 (shown as transparent in FIG. 21) formed of a powder magnetic material, such as powdered iron within a binder, staple style windings 2104, 2106, and electrical terminals 2108, 2110, 2112, 2114. Terminals 2108, 2112 are disposed proximate to a first side 2116 of core 2102, and terminals 2110, 2114 are disposed proximate to an opposite second side 2118 of core 2102. Winding 2104 is electrically coupled between terminals 2108, 2110, and winding 2106 is electrically coupled between terminals 2112, 2114.

Windings 2104, 2106 are configured in core 2102 such that an increasing electric current flowing through winding 2104 from a first terminal 2108 to second terminal 2110 induces an increasing electric current in winding 2106 flowing from fourth terminal 2114 to third terminal 2112. Accordingly, inverse magnetic coupling is achieved with coupled inductor 2100 when terminals on opposite sides 2116, 2118 of core 2102 are connected to respective switching nodes. Thus, certain embodiments of coupled inductor 2100 may be used with PCB layout 500 (FIG. 5).

Leakage inductance associated with windings 2104, 2106 increases as spacing 2120 between windings 2104, 2106 increases (see FIG. 22). Accordingly, leakage inductance can be varied during the design of coupled inductor 2100 merely by varying spacing 2120, which promotes ease manufacturing of embodiments of coupled inductor 2100 having different leakage inductance values. In contrast, some conventional coupled inductors require a change in core geometry and/or a change in gap thickness to vary leakage inductance, possibly requiring extensive changes in tooling to vary leakage inductance.

Figure 23:
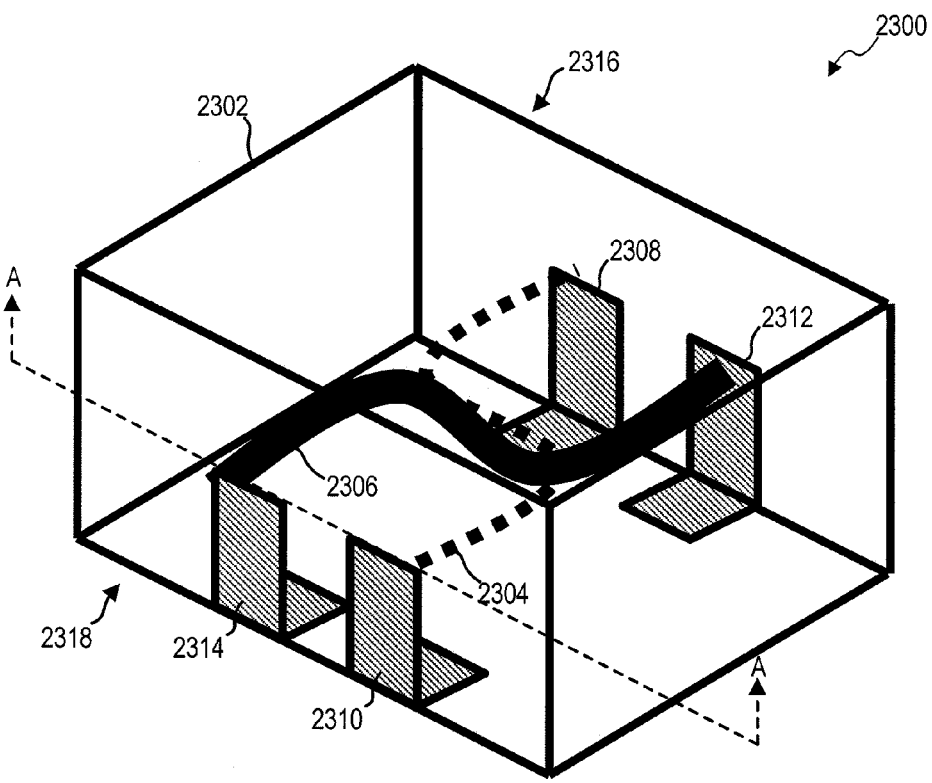
FIG. 23 shows a perspective view and FIG. 24 shows a top cross sectional view of another two phase coupled inductor, according to an embodiment.
Figure 24:
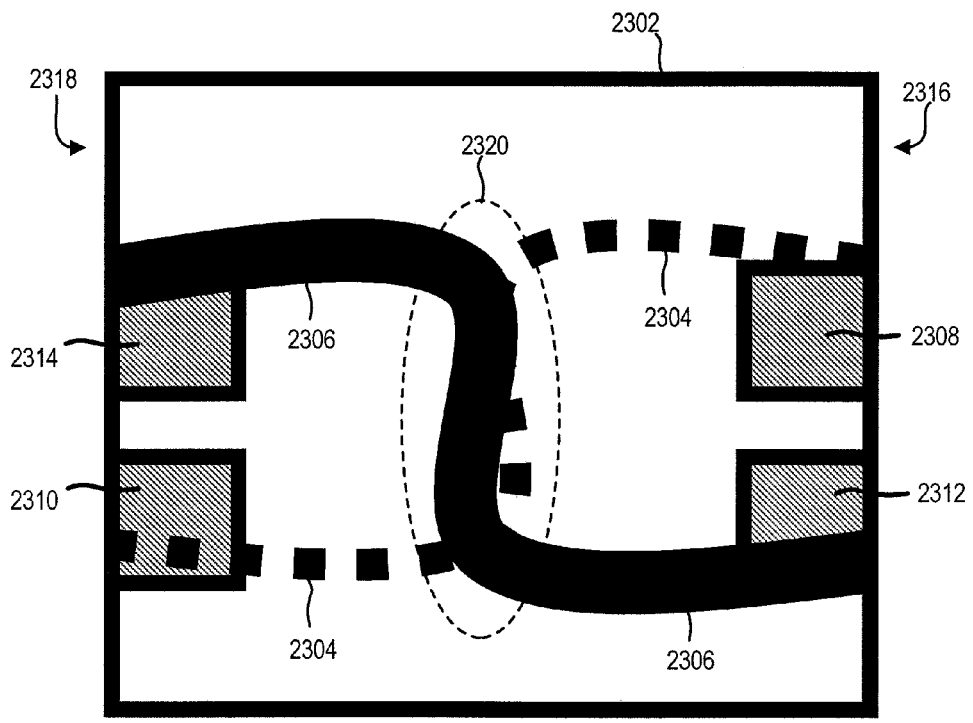

FIG. 23 shows a perspective view of one coupled inductor 2300, and FIG. 24 shows a cross sectional view of coupled inductor 2300 taken along line A-A of FIG. 23. Coupled inductor 2300 includes a core 2302, shown as transparent in FIG. 23, formed of a powder magnetic material, such as powdered iron within a binder. Coupled inductor 2300 further includes windings 2304, 2306 at least partially embedded in core 2302 and electrical terminals 2308, 2310, 2312, and 2314. Winding 2304 is electrically coupled between terminals 2308, 2310, and winding 2306 is electrically coupled between terminals 2312, 2314. Winding 2304 is shown as a dashed line in FIGS. 23 and 24 for illustrative purposes (i.e., to assist in distinguishing between windings 2304, 2306 in the figures). In actuality, winding 2304 is typically formed of the same material as winding 2306. Terminals 2308, 2312 are disposed proximate to a first side 2316 of core 2302, and terminals 2310, 2314 are disposed proximate to a second side 2318 of core 2302.

Portions 2320 of windings 2304, 2306 are aligned with each other (e.g., at least partially vertically overlap each other) so that windings 2304, 2306 are magnetically coupled (see FIG. 24). The more windings 2304, 2306 are aligned with each other, the greater will be the magnetizing inductance of coupled inductor 2300. Accordingly, magnetizing inductance can be varied during the design of coupled inductor by varying the extent to which windings 2304, 2306 are aligned with each other.

Portions of windings 2304, 2306 that are not aligned with each other contribute to leakage inductance associated with windings 2304, 2306. Accordingly, leakage inductance can be varied during the design of coupled inductor 2300 by varying the extent to which windings 2304, 2306 are not aligned with each other as well as spacing between windings.

In contrast with the windings of coupled inductor 2100 (FIG. 21), windings 2304, 2306 cross each other in magnetic core 2302 such that an increasing current flowing through winding 2304 from first terminal 2308 to second terminal 2310 induces an increasing current through winding 2306 from third terminal 2312 to fourth terminal 2314. Thus, inverse magnetic coupling is achieved with coupled inductor 2300 when either terminals 2308, 2312 or 2310, 2314 are electrically coupled to respective switching nodes. Accordingly, certain embodiments of coupled inductor 2300 can be used with layout 900 of FIG. 9.

Figure 25:
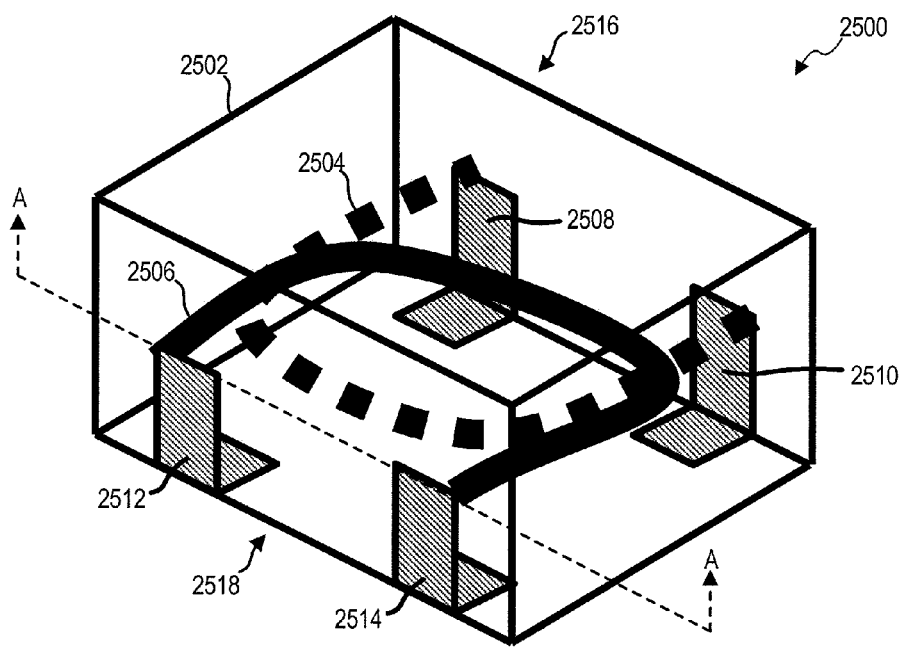
FIG. 25 shows a perspective view and FIG. 26 shows a top cross sectional view of another two phase coupled inductor, according to an embodiment.
Figure 26:
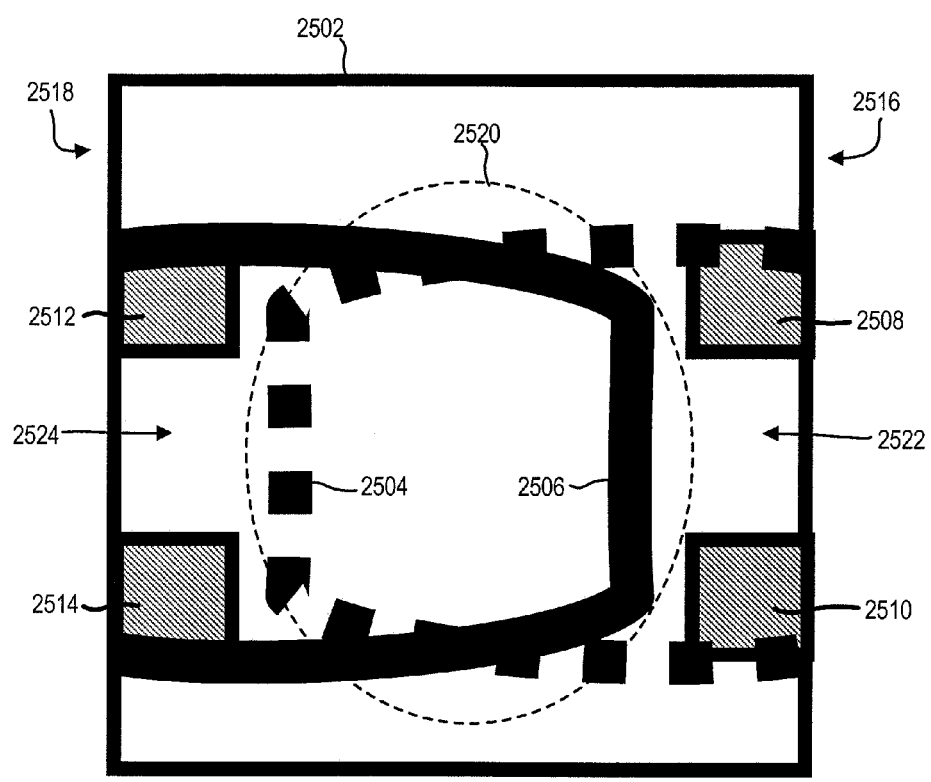

FIG. 25 shows a perspective view of one coupled inductor 2500, and FIG. 26 shows a cross sectional view of coupled inductor 2500 taken along line A-A of FIG. 25. Coupled inductor 2500 includes a core 2502, shown as transparent in FIG. 25, formed of a powder magnetic material, such as powdered iron within a binder. Coupled inductor 2500 further includes windings 2504, 2506 at least partially embedded in core 2502 and electrical terminals 2508, 2510, 2512, and 2514. Winding 2504 is electrically coupled between terminals 2508, 2510, and winding 2506 is electrically coupled between terminals 2512, 2514. Winding 2504 is shown as a dashed line in FIGS. 25 and 26 for illustrative purposes (i.e., to assist in distinguishing between windings 2504, 2506 in the figures). In actuality, winding 2504 is typically formed of the same material as winding 2506. Terminals 2508, 2510 are disposed proximate to a first side 2516 of core 2502, and terminals 2512, 2514 are disposed proximate to a second side 2518 of core 2502.

Center portions 2520 of windings 2504, 2506 are aligned with each other so that windings 2504, 2506 are magnetically coupled. The more windings 2504, 2506 are aligned with each other, the greater will the magnetizing inductance of coupled inductor 2500. Accordingly, magnetizing inductance can be varied during the design of coupled inductor 2500 by varying the extent to which windings 2504, 2506 are aligned with each other.

Portions of windings 2504, 2506 that are not aligned with each other contributed to leakage inductance associated with windings 2504, 2506. Accordingly, leakage inductance can be varied during the design of coupled inductor 2500 by varying the extent to which windings 2504, 2506 are not aligned with each other.

It should also be noted that coupled inductor 2500 can be configured during its design to have asymmetric leakage inductance values—that is, so that the respective leakage inductance values associated with windings 2504, 2506 are different. Coupled inductor 2500 includes core portions 2522, 2524, which are shown as having the same size in FIG. 26. Portion 2522 represents a portion of core 2502 bounded by winding 2504 but outside of center portion 2520. Similarly, portion 2524 represents a portion of core 2502 bounded by winding 2506 but outside of center portion 2520. Since portions 2522, 2524 have the same size, the respective leakage inductance values associated with windings 2504, 2506 are approximately equal. However, if couple inductor 2500 is modified such that portions 2522, 2524 have different sizes, coupled inductor will have asymmetric leakage inductance values. For example, if portion 2522 is made larger than portion 2524, the leakage inductance value associated with winding 2504 will be larger than the leakage inductance value associated with winding 2506.

Windings 2504, 5506 are configured in core 2502 such that an increasing current flowing through winding 2504 from first terminal 2508 to second terminal 2510 induces an increasing current through winding 2506 flowing from third terminal 2512 to fourth terminal 2514. Thus, inverse magnetic coupling is achieved with coupled inductor 2500 in DC-to-DC converter applications when either terminals 2508, 2512 or 2510, 2514 are electrically coupled to respective switching nodes.

Figure 27:
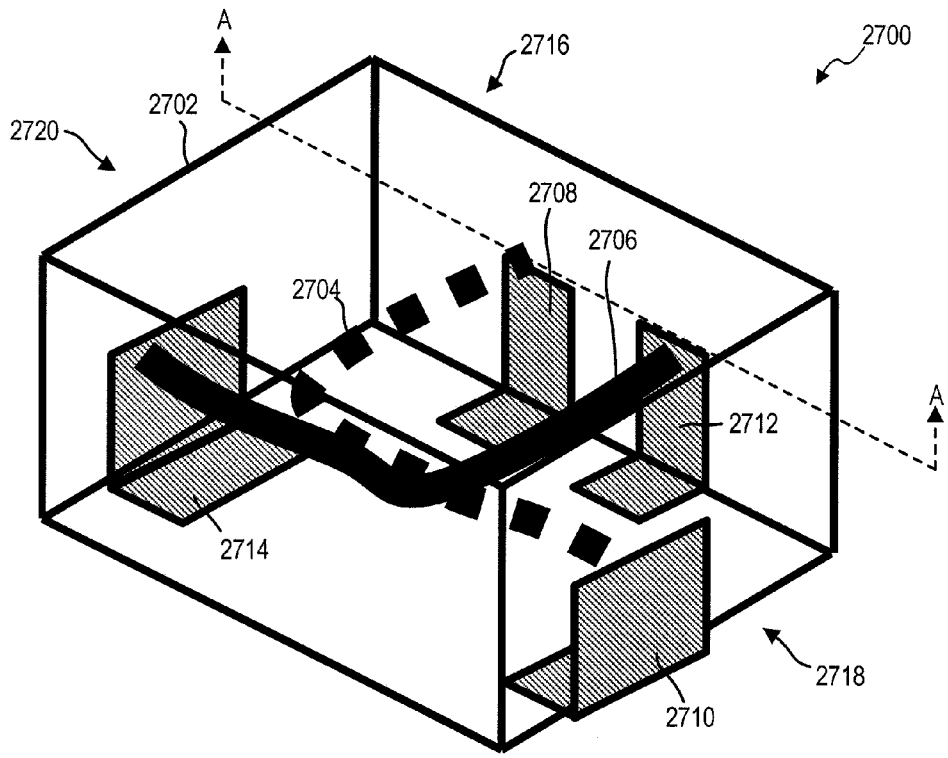
FIG. 27 shows a perspective view and FIG. 28 shows a top cross sectional view of another two phase coupled inductor, according to an embodiment.
Figure 28:
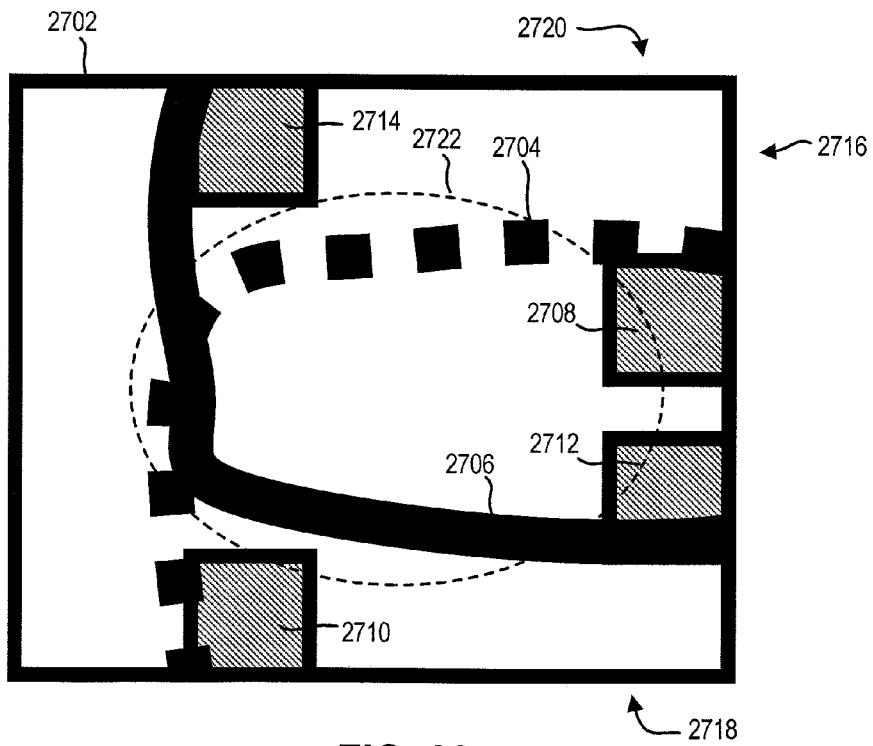

FIG. 27 shows a perspective view of one coupled inductor 2700, and FIG. 28 shows a cross sectional view of coupled inductor 2700 taken along line A-A of FIG. 27. Coupled inductor 2700 includes a core 2702, shown as transparent in FIG. 27, and formed of a powder magnetic material, such as powdered iron within a binder. Coupled inductor 2700 further includes windings 2704, 2706 at least partially embedded in core 2702 and electrical terminals 2708, 2710, 2712, and 2714. Winding 2704 is electrically coupled between terminals 2708, 2710, and winding 2706 is electrically coupled between terminals 2712, 2714. Winding 2704 is shown as a dashed line in FIGS. 27 and 28 for illustrative purposes (i.e., to assist in distinguishing between windings 2704, 2706 in the figures). In actuality, winding 2704 is typically formed of the same material as winding 2706. Windings 2704, 2706 cross each other in magnetic core 2702. Terminals 2708, 2712 are disposed proximate to a first side 2716 of core 2702, terminal 2710 is disposed proximate to a second side 2718 of core 2702, and terminal 2714 is disposed proximate to a third side 2720 of core 2702. As shown in FIG. 27, second side 2718 is opposite to third side 2720, and first side 2716 is disposed between second and third sides 2718, 2720.

Center portions 2722 of windings 2704, 2706 are aligned with each other so that windings 2704, 2706 are magnetically coupled. The more windings 2704, 2706 are aligned with each other, the greater will the magnetizing inductance of coupled inductor 2700. Accordingly, magnetizing inductance can be varied during the design of coupled inductor 2700 by varying the extent to which windings 2704, 2706 are aligned with each other.

Portions of windings 2704, 2706 that are not aligned with each other contribute to leakage inductance associated with windings 2704, 2706. Accordingly, leakage inductance can be varied during the design of coupled inductor 2700 by varying the extent to which windings 2704, 2706 are not aligned with each other.

Windings 2704, 2706 are configured in core 2702 such that an increasing current flowing through winding 2704 from first terminal 2708 to second terminal 2710 induces an increasing current through winding 2706 flowing from third terminal 2712 to fourth terminal 2714. Thus, inverse magnetic coupling is achieved with coupled inductor 2700 in DC-to-DC converter applications when either terminals 2708, 2712 or 2710, 2714 are electrically coupled to respective switching nodes.

FIG. 29 shows a perspective view of one coupled inductor 2900, and FIG. 30 shows a cross sectional view of coupled inductor 2900 taken along line A-A of FIG. 29. Coupled inductor 2900 is similar to coupled inductor 2700 (FIG. 27), but includes windings 2902, 2904 forming one or more complete turns, instead of windings 2704, 2706. FIG. 31 shows a perspective view of windings 2902, 2904 separated from themselves and from coupled inductor 2900. Although coupled inductor 2900 is shown with windings 2902, 2904 forming about one and a half complete turns, one or more windings 2902, 2904 may form more turns (e.g., about two and a half turns).

Use of windings forming multiple turns increases magnetic coupling between the windings, thereby increasing magnetizing inductance, which may be beneficial in switching power converter applications. For example, in a multi-phase DC-to-DC converter using a coupled inductor, increasing magnetizing inductance typically decreases ripple current in the inductors and the switches. Alternately, increasing the number of turns may enable core material permeability to be decreased while still maintaining a desired magnetizing inductance value, thereby reducing magnetic flux in the core and associated core losses.

FIG. 32 shows a perspective view of one coupled inductor 3200, and FIG. 33 shows a cross sectional view of coupled inductor 3200 taken along line A-A of FIG. 32. Coupled inductor 3200 includes a core 3202, shown as transparent in FIG. 32, formed of a powder magnetic material, such as powdered iron within a binder. Coupled inductor 3200 further includes windings 3212, 3214 at least partially embedded in core 3202 and electrical terminals 3206, 3208, and 3210. Winding 3212 is electrically coupled between terminals 3206, 3210, while winding 3214 is electrically between terminals 3208, 3210. In certain embodiments, windings 3212, 3214 are formed from a common piece of wire 3204 that is coupled along its length to terminal 3210. In certain embodiments where windings 3212, 3214 are part of a common wire 3204, a portion of wire 3204 is flattened to form terminal 3210. FIG. 34 shows a perspective view of windings 3212, 3214 separated from themselves and from coupled inductor 3200. Terminals 3206, 3208 are disposed proximate to a first side 3216 of core 3202, and terminal 3210 is disposed proximate to a second side 3218 of core 3202.

Central portions 3220 of windings 3212, 3214 are aligned with each other so that windings 3212, 3214 are magnetically coupled. Portions of windings 3212, 3214 that are not aligned with each other contribute to leakage inductance associated with windings 3212, 3214. The number of turns formed by windings 3212, 3214 and/or the shape of windings 3212, 3214 can be varied during the design of coupled inductor 3200 to control leakage inductance and/or magnetizing inductance. For example, windings 3212, 3214 could be modified to form additional turns or not turns at all. Increasing the portions of windings 3212, 3214 that are aligned increases magnetizing inductance, and increasing portions of windings 3212, 3214 that are not aligned increases leakage inductance.

As discussed above, in certain embodiments, windings 3212, 3214 are formed from a common wire. Such configuration promotes low cost of coupled inductor 3200, since it is typically cheaper and/or easier to manufacture a single winding inductor that a multiple winding inductor. Additionally, the fact that both of windings 3212, 3214 are connected to a common terminal 3210 may promote precise relative positioning of windings 3212, 3214, thereby promoting tight leakage and magnetizing inductance tolerance.

Windings 3212, 3214 are configured in core 3202 such that an increasing current flowing through winding 3212 from first terminal 3206 to third terminal 3210 induces an increasing current through winding 3214 flowing from second terminal 3208 to third terminal 3210. Thus, inverse magnetic coupling is achieved with coupled inductor 3200 in DC-to-DC converter applications when terminals 3206, 3208 are electrically coupled to respective switching nodes.

Certain embodiments of the powder magnetic core coupled inductors disclosed herein may have one or more desirable characteristics. For example, because the windings of certain embodiments of the coupled inductors are at least partially embedded in a magnetic core, they do not necessarily need to be wound through a passageway of a magnetic core, thereby promoting low cost and manufacturability, particularly in embodiments with multiple turns per winding, and/or complex shaped windings. As another example, certain embodiments of the coupled inductors disclosed herein may be particularly mechanically robust because their windings are embedded in, and thereby protected by, the magnetic core. In yet another exemplary embodiment, leakage inductance of certain embodiments of the coupled inductors disclosed herein can be adjusted during the design stage merely by adjusting a separation between windings in the magnetic core.

Although some of the examples above show one turn per winding, it is anticipated that certain alternate embodiments of the coupled inductors discussed herein will form two or more turns per winding. Additionally, although windings are electrically isolated from each other within the magnetic cores in most of the examples discussed herein, in certain alternate embodiments, two or more windings are electrically coupled together, or ends of two or more windings are connected to a single terminal. Such alternate embodiments may be useful in applications where respective ends of two or more windings are connected to a common node (e.g., a buck converter output node or a boost converter input node). For example, in an alternate embodiment of coupled inductor 600 (FIG. 6), winding 604 is electrically coupled between first and second terminals 608, 610, winding 606 is electrically coupled between third and second terminals 612, 610, and fourth terminal 614 may be eliminated. Furthermore, as discussed above, the configurations of the electrical terminals can be varied (e.g., solder tabs may be replaced with through-hole pins).

For purposes of this document, the term binder includes, but is not limited to, a synthetic polymer (e.g., thermoplastic or thermosetting materials), a synthetic or natural rubber, colloids, gums, or resins that bind the powder magnetic material.

As discussed above, one example of a powder core magnetic material that may be used to form the cores of the coupled inductors disclosed herein is iron within a binder, such as iron within a polymeric binder. However, it is anticipated that in certain embodiments, another magnetic material, such as nickel, cobalt, and/or alloys of rare earth metals, will be used in place of or in addition to iron. In some embodiments, the magnetic material is alloyed with other magnetic and/or nonmagnetic elements. For example, in certain embodiments, the powder core magnetic material includes an alloy of iron within a binder, such as iron alloyed with cobalt, carbon, nickel, and/or molybdenum within a binder.

In certain embodiments, the powder core magnetic material is moldable, such that the magnetic core may be cured in a mold to form a "molded" magnetic core.

It should be appreciated that the powder magnetic material magnetic cores discussed herein are monolithic (i.e., single unit) magnetic cores, in contrast to magnetic cores formed of a number of discrete magnetic elements. Furthermore, it should be appreciated that the powder magnetic material cores discussed herein are different from ferrite cores, which are formed from fired ceramic material.

Figure 35:
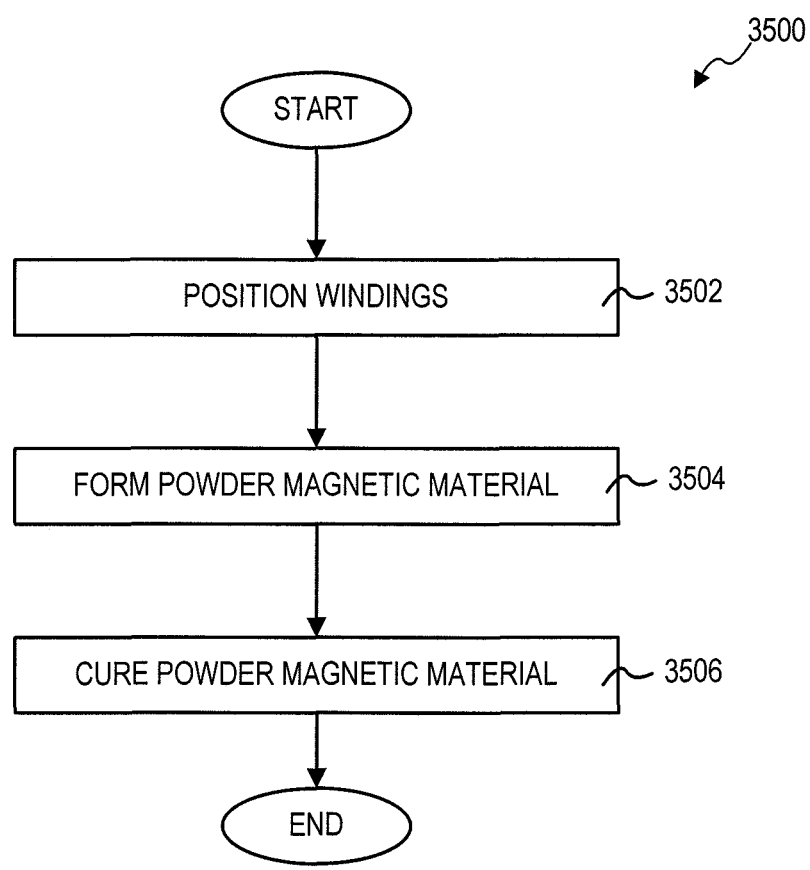
FIG. 35 illustrates a method for forming a multiphase coupled inductor, according to an embodiment.

FIG. 35 illustrates a method 3500 for forming powder magnetic core coupled inductors. Method 3500 may be used to form certain embodiments of the coupled inductors discussed herein having windings embedded in a magnetic core. However, method 3500 is not limited to forming such embodiments, and the embodiments discussed herein may be formed by methods other than method 3500.

Method 3500 includes step 3502 of positioning a plurality of windings such that each of the plurality of windings is at least partially physically separated from each other of the plurality of windings. An example of step 3502 is positioning windings 104, 106 of FIG. 1 such that they are separate from each other. Another example of step 3502 is positioning windings 104, 106 in a mold such that they are at least partially physically separated from each other. The windings are, for example, completely physically separated and/or aligned to form at least one turn around a common axis, such as shown in FIG. 1. In step 3504, a powder magnetic material is formed at least partially around the plurality of windings positioned in step 3502. An example of step 3504 is forming a powder magnetic material including powdered iron or a similar magnetic powder within a binder around windings 104, 106 of FIG. 1. Another example of step 3504 is disposing a powder magnetic material including a binder in a mold in which windings 104, 106 are positioned. In step 3506, the binder of the powder magnetic material formed in step 3504 is cured (e.g., heated, subjected to pressure, and/or subjected to one or more chemicals), thereby forming a monolithic magnetic core with windings embedded therein. An example of step 3506 is sintering the powder magnetic material formed around windings 104, 106 of FIG. 1 to form magnetic core 102. Another example of step 3506 is curing via a chemical reaction (e.g., catalytic curing) a composite material including powdered magnetic material combined with an epoxy or a thermosetting binder disposed in a mold around windings 104, 106.

As discussed above, one possible use of the coupled inductors disclosed herein is in switching power supplies, such as in switching DC-to-DC converters. Accordingly, the magnetic material used to form the magnetic cores is typically a material that exhibits a relatively low core loss at high switching frequencies (e.g., at least 20 KHz) that are common in switching power supplies.

Figure 36:
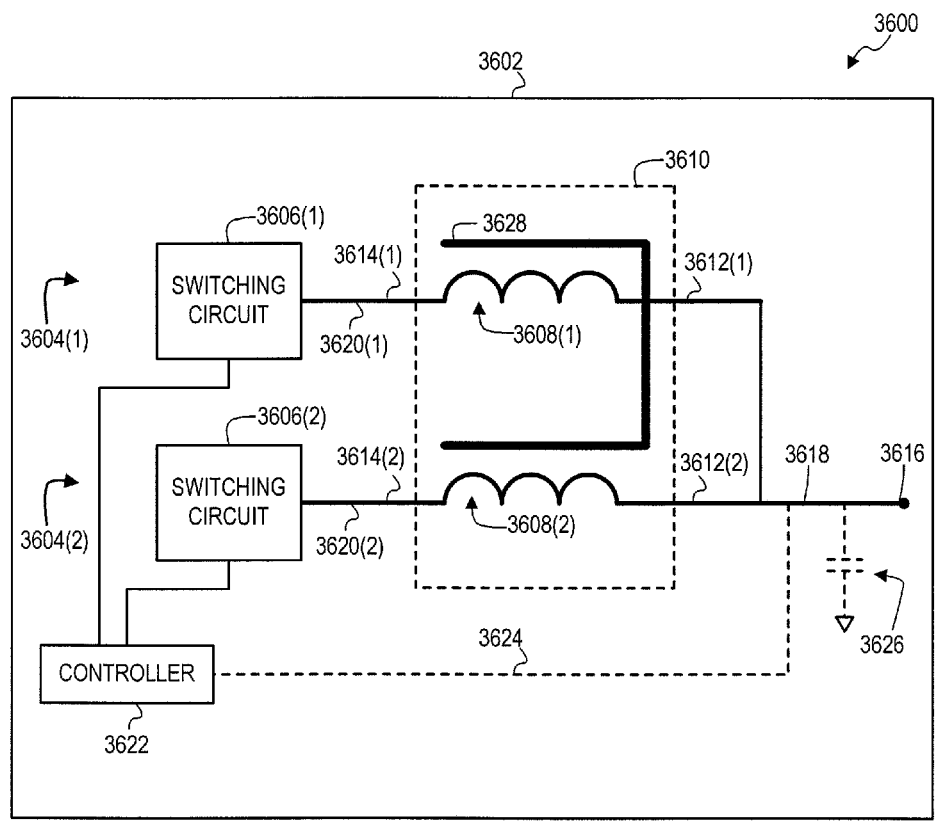
FIG. 36 shows one power supply, according to an embodiment.

FIG. 36 schematically shows one power supply 3600, which is one possible application of the coupled inductors discussed herein. Power supply 3600 includes a PCB 3602 for supporting and electrically connecting components of power supply 3600. PCB 3602 could alternately be replaced with a number of separate, but electrically interconnected, PCBs.

Figure 53:
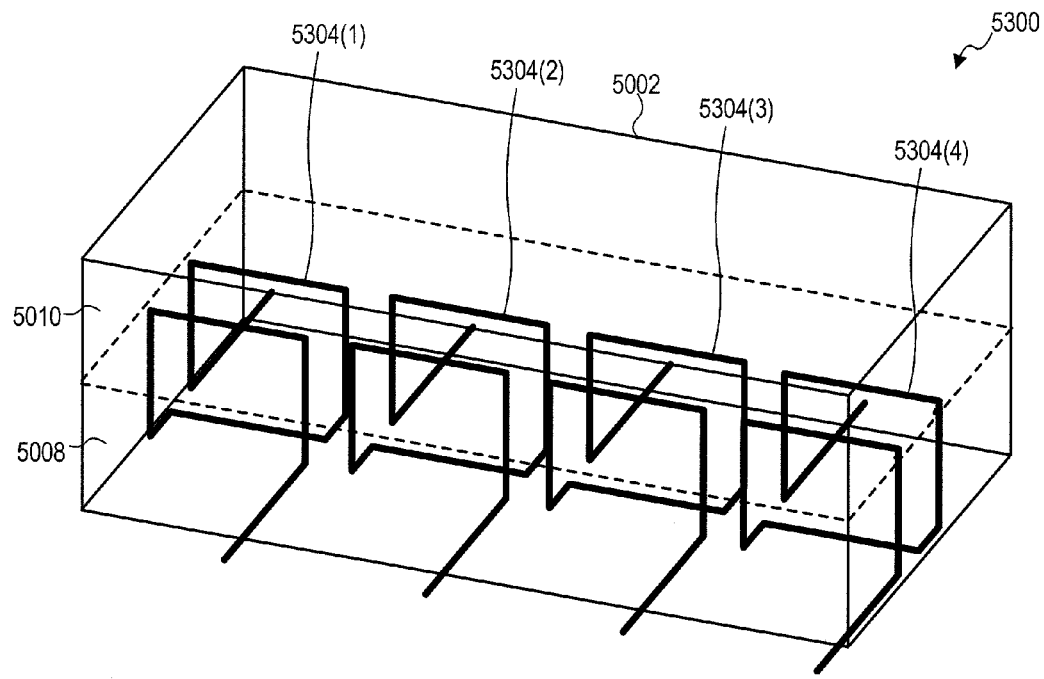
FIG. 53 shows a perspective view of a coupled inductor similar to that of FIG. 52 but including multi-turn windings, according to an embodiment.
Figure 54:
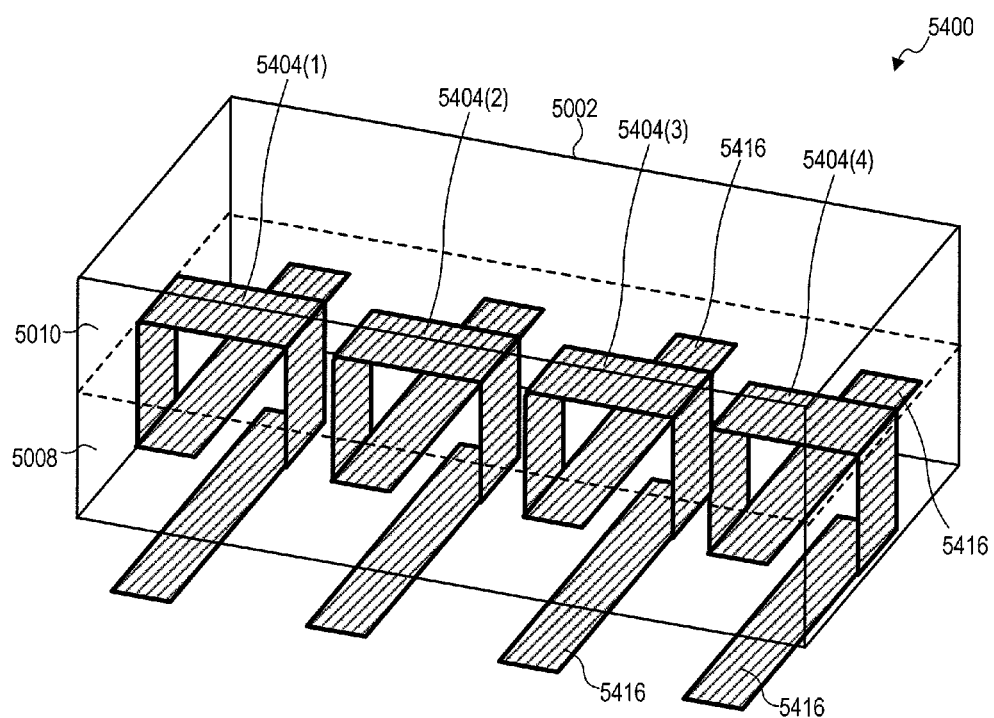
FIG. 54 shows a perspective view of a coupled inductor similar to that of FIG. 50 but including foil windings, according to an embodiment.

Power supply 3600 is shown as including two phases 3604, where each phase includes a respective switching circuit 3606 and a winding 3608 of a two-phase coupled inductor 3610. However, alternative embodiments of power supply 3600 may have a different number of phases 3604, such as four phases, where a first pair of phases utilizes windings of a first two-phase coupled inductor, and a second pair of phases utilizes windings of a second two-phase coupled inductor. Examples of two-phase coupled inductor 3610 include coupled inductor 100 (FIG. 1), coupled inductor 600 (FIG. 6), coupled inductor 1000 (FIG. 10), coupled inductor 1300 (FIG. 13), coupled inductor 1700 (FIG. 17), coupled inductor 2100 (FIG. 21), coupled inductor 2300 (FIG. 23), coupled inductor 2500 (FIG. 25), coupled inductor 2700 (FIG. 27), coupled inductor 2900 (FIG. 29), coupled inductor 3200 (FIG. 32), a two winding embodiment of coupled inductor 3700 (FIG. 37), a two winding embodiment of coupled inductor 4000 (FIG. 40), a two winding embodiment of coupled inductor 4200 (FIG. 42), a two winding embodiment of coupled inductor 4300 (FIG. 43), a two winding embodiment of coupled inductor 4700 (FIG. 47), a two winding embodiment of coupled inductor 4800 (FIG. 48), a two winding embodiment of coupled inductor 5000 (FIG. 50), a two winding embodiment of coupled inductor 5200 (FIG. 52), a two winding embodiment of coupled inductor 5300 (FIG. 53), and a two winding embodiment of coupled inductor 5400 (FIG. 54). Additionally, alternate embodiments having three or more phases 3604 may use one of scalable coupled inductors 3700, 4000, 4200, 4300, 4700, 4800, 5000, 5200, 5300, or 5400, discussed below, as a three or more phase coupled inductor.

Each winding 3608 has a respective first end 3612 and a respective second end 3614. First and second ends 3612, 3614, for example, form surface mount solder tabs suitable for surface mount soldering to PCB 3602. For example, in an embodiment where coupled inductor 3610 is an embodiment of coupled inductor 100 (FIG. 1), first end 3612(1) represents terminal 110, second end 3614(1) represents terminal 108, first end 3612(2) represents terminal 112, and second end 3614(2) represents terminal 114. Each first end 3612 is electrically connected to a common first node 3616, such as via a PCB trace 3618.

Each second end 3614 is electrically connected to a respective switching circuit 3606, such as by a respective PCB trace 3620. Switching circuits 3606 are configured to switch second end 3614 of their respective winding 3608 between at least two different voltage levels. Controller 3622 controls switching circuits 3606, and controller 3622 optionally includes a feedback connection 3624, such as to first node 3616. First node 3616 optionally includes a filter 3626.

Power supply 3600 typically has a switching frequency, the frequency at which switching circuits 3606 switch, of at least about 20 kHz, such that sound resulting from switching is above a frequency range perceivable by humans. Operating switching power supply 3600 at a high switching frequency (e.g., at least 20 kHz) instead of at a lower switching frequency may also offer advantages such as (1) an ability to use smaller energy storage components (e.g., coupled inductor 3610 and filter capacitors), (2) smaller ripple current and ripple voltage magnitude, and/or (3) faster converter transient response. To enable efficient operation at high switching frequencies, the one or more magnetic materials forming a magnetic core 3628 of coupled inductor 3610 are typically materials having relatively low core losses at high frequency operation.

In some embodiments, controller 3622 controls switching circuits 3606 such that each switching circuit 3606 operates out of phase from each other switching circuit 3606. Stated differently, in such embodiments, the switched waveform provided by each switching circuit 3606 to its respective second end 3614 is phase shifted with respect to the switched waveform provided by each other switching circuit 3606 to its respective second end 3614. For example, in certain embodiments of power supply 3600, switching circuit 3606(1) provides a switched waveform to second end 3614(1) that is about 180 degrees out of phase with a switched waveform provided by switching circuit 3606(2) to second end 3614(2).

In embodiments where power supply 3600 is a DC-to-DC converter, it utilizes, for example, one of the PCB layouts discussed above, such as PCB layout 500 (FIG. 5), 900 (FIG. 9), 1600 (FIG. 16), or 2000 (FIG. 20). For example, if power supply 3600 is a DC-to-DC converter using inductor 600 with PCB layout 900, switching circuits 914, 916 of layout 900 correspond to switching circuits 3606(1), 3606(2) of power supply 3600, and switching traces 918, 920 of layout 900 correspond to traces 3620(1), 3620(2) of power supply 2200.

Power supply 3600 can be configured to have a variety of configurations. For example, switching circuits 3606 may switch their respective second ends 3614 between an input voltage node (not shown) and ground, such that power supply 3600 is configured as a buck converter, first node 3616 is an output voltage node, and filter 3626 is an output filter. In this example, each switching circuit 3606 includes at least one high-side switching device and at least one catch diode, or at least one high-side switching device and at least one low-side switching device. In the context of this document, a switching device includes, but is not limited to, a bipolar junction transistor, a field effect transistor (e.g., an N-channel or P-channel metal oxide semiconductor field effect transistor, a junction field effect transistor, or a metal semiconductor field effect transistor), an insulated gate bipolar junction transistor, a thyristor, or a silicon controlled rectifier.

In another exemplary embodiment, power supply 3600 is configured as a boost converter such that first node 3616 is an input power node, and switching circuits 3606 switch their respective second end 3614 between an output voltage node (not shown) and ground. Additionally, power supply 3600 can be configured, for example, as a buck-boost converter such that first node 3616 is a common node, and switching circuits 3606 switch their respective second end 3614 between an output voltage node (not shown) and an input voltage node (not shown).

Furthermore, in yet another example, power supply 3600 may form an isolated topology. For example, each switching circuit 3606 may include a transformer, at least one switching device electrically coupled to the transformer's primary winding, and a rectification circuit coupled between the transformer's secondary winding and the switching circuit's respective second end 3614. The rectification circuit optionally includes at least one switching device to improve efficiency by avoiding forward conduction voltage drops common in diodes.

Figure 37:
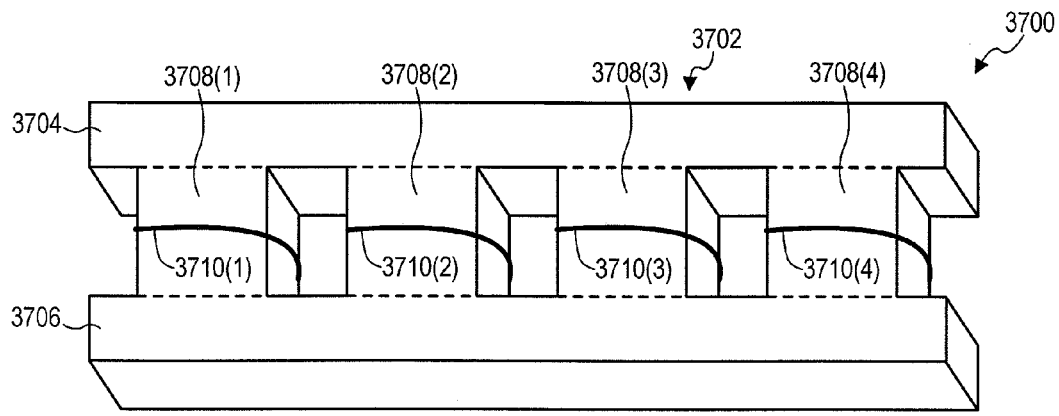
FIGS. 37-39 respectively show a perspective view, a top plan view, and a cross sectional view of a scalable powder magnetic core coupled inductor, according to an embodiment.
Figure 38:
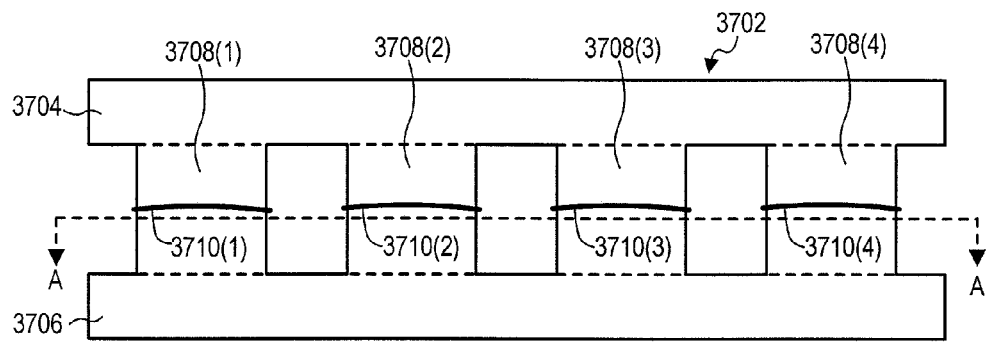
Figure 39:
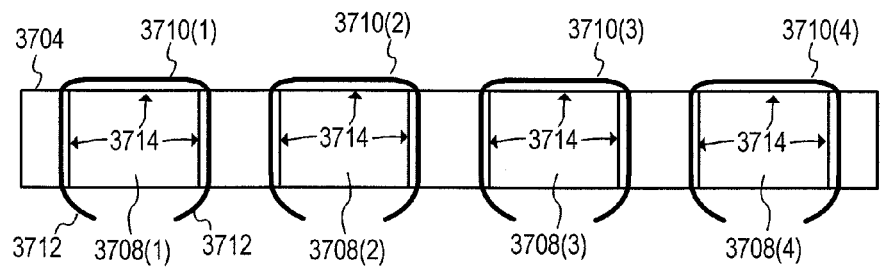

FIGS. 37-47 show powder magnetic material cores in coupled inductors which are scalable, meaning that they can be adapted to include N magnetically coupled windings, where N is an integer greater than one. FIGS. 37-39 respectively show a perspective view, a top plan view, and a cross sectional view of a powder magnetic core coupled inductor 3700, where the cross section of FIG. 39 is taken along line A-A of FIG. 38.

Coupled inductor 3700 includes a monolithic magnetic core 3702 formed of a powder magnetic material, such as powdered iron within a curable binder, such as a polymeric binder. Magnetic core 3702 includes end magnetic elements 3704, 3706, as well as N legs 3708 disposed in a row, where N is an integer greater than one. Each leg 3708 connects end magnetic elements 3704, 3706. Accordingly, magnetic core 3702 has a "ladder" configuration, where end magnetic elements 3704, 3706 are analogous to ladder rails, and legs 3708 are analogous to ladder rungs. Dashed lines delineate legs 3708 from end magnetic elements 3704, 3706 in FIGS. 37 and 38 solely to help the viewer distinguish these elements. These dashed lines do not represent discontinuities in magnetic core 3702, as core 3702 is a single unit powder magnetic material core.

Coupled inductor 3700 further includes N windings 3710, and a respective one of the N windings 3710 is wound around each leg 3708. Magnetic core 3702 provides a path for magnetic flux coupling windings 3710. Windings 3710 are single or multi-turn windings having ends forming terminals 3712 (see FIG. 39). Only some terminals 3712 are labeled in FIG. 39 for illustrative clarity. Windings 3710 optionally include connectors, such as solder tabs or through-hole pins (not shown), at their terminals 3712. In certain embodiments, windings 3710 are foil windings (i.e., windings with a rectangular cross section) to promote low winding impedance.

Each winding 3710 is wound around an outer surface 3714 of its respective leg 3708. However, in alternate embodiments, at least one winding 3710 is at least partially embedded in its respective leg 3708. Embedding windings 3710 in legs 3708 may facilitated forming multi-turn windings, as discussed above. Additionally, embedding windings 3710 in legs 3708 may increase leakage inductance values associated with windings 3710, as discussed below.

Figure 40:
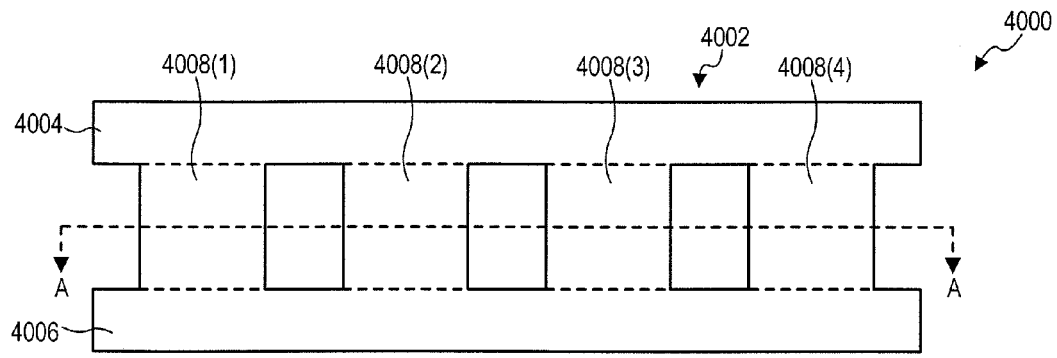
FIG. 40 shows a top plan view and FIG. 41 shows a cross sectional view of a scalable powder magnetic core coupled inductor similar to the inductor of FIGS. 37-39, but with windings embedded in a magnetic core, according to an embodiment.
Figure 41:
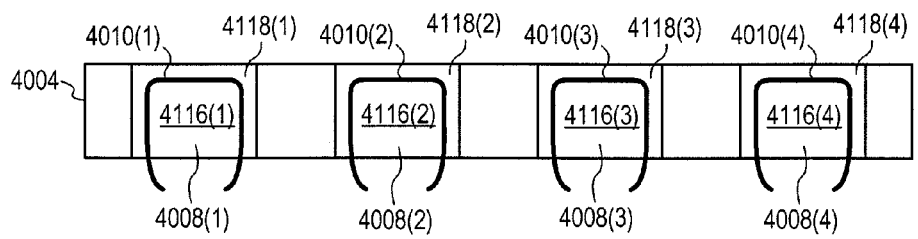

FIG. 40 shows a top plan view of a coupled inductor 4000, which is similar to coupled inductor 3700, but includes windings 4010 embedded in legs 4008. Legs 4008 and end magnetic elements 4004, 4006 collectively form a monolithic magnetic core 4002 formed of a powder magnetic material, such as powdered iron within a binder. Windings 4010 are not visible in the top plan view of FIG. 40 because they are embedded in legs 4008. However, FIG. 41 shows a cross sectional view of coupled inductor 4000 taken along line A-A of FIG. 40 and showing windings 4010. Legs 4008 have non-zero values of cross sectional areas 4116 within windings 4010 and non-zero values of cross sectional areas 4118 outside of windings 4010. Cross sectional areas 4116 of legs 4008 contribute to magnetic coupling of windings 4010. However, cross sectional areas 4118 of legs 4008 do not contribute to magnetic coupling of windings 4010; instead, cross sectional areas 4118 contribute to leakage inductance values associated with windings 4010. Accordingly, leakage inductance values associated with windings 4010 will be greater in coupled inductor 4000 than in coupled inductor 3700, assuming all else is equal.

Magnetizing and/or leakage inductance values of windings 4010 can be varied during design of coupled inductor 4000 by varying the size and/or configuration of cross sectional areas 4116 and/or 4118. For example, increasing size of cross sectional areas 4116 increases magnetizing inductance, and increasing size of cross sectional areas 4118 increases leakage inductance. In alternate embodiments, windings 4010 are embedded near the outer surface of legs 4008 such that the cross sectional areas 4118 of core material in legs 4008 not surrounded by winding 4010 are negligible.

In alternate embodiments, cross sectional areas 4116 and/or 4118 vary among instances of legs 4008 so that coupled inductor 4000 has asymmetric leakage inductance values. For example, in some embodiments, cross sectional area 4118(1) of leg 4008(1) is greater than the cross sectional areas 4118 of the remaining legs 4008 such that leakage inductance associated with winding 4010(1) is greater than that associated with remaining windings 4010.

Figure 42:
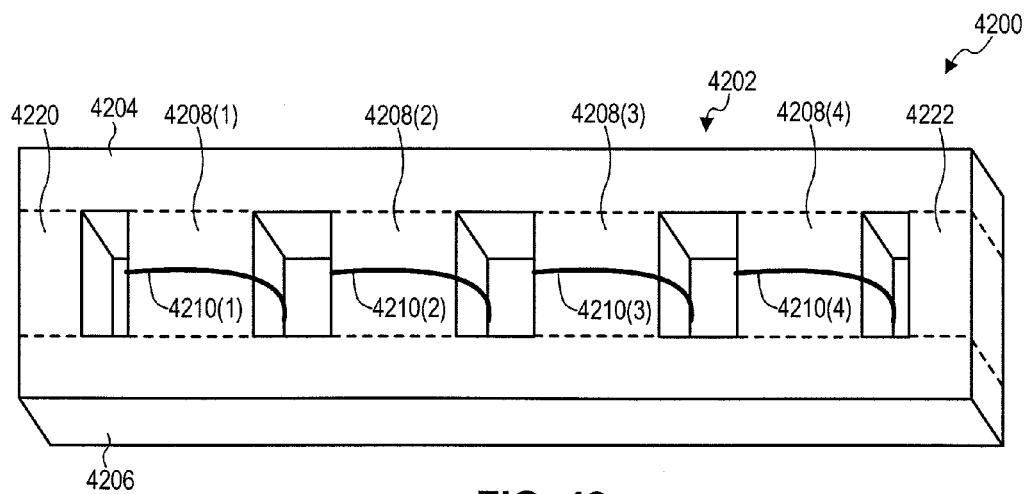
FIG. 42 shows a perspective view of a scalable powder magnetic core coupled inductor similar to that of FIGS. 37-39, but further including shunt legs, according to an embodiment.

Additional features can be added to coupled inductor 3700 to increase leakage inductance of windings 3710. For example, FIG. 42 shows a perspective view of coupled inductor 4200, which is similar to coupled inductor 3700, but additionally includes outer legs 4220, 4222. Coupled inductor 4200 includes a monolithic magnetic core 4202 formed of a powder magnetic material, such as powdered iron within a binder. Core 4202 includes end magnetic elements 4204, 4206, N legs 4208 connecting end magnetic elements 4204, 4206, where N is an integer greater than one, and outer legs 4220, 4222. Legs 4208 and outer legs 4220, 422 are disposed in a row, and legs 4208 are disposed between outer legs 4220, 4222. Coupled inductor 4200 further includes N windings 4210, and a respective one of the N windings 4210 is wound at least partially around each leg 4208. In alternate embodiments, windings 4210 are at least partially embedded in legs 4208 and/or are multi-turn windings. The dashed lines of FIG. 42 delineate magnetic core elements for illustrative purposes and do not represent discontinuities in magnetic core 4202, as core 4202 is a single unit core.

Outer legs 4220, 4222 connect end magnetic elements 4204, 4206, but in contrast to legs 4208, outer legs 4220, 4222 typically do not include windings. Instead, outer legs 4220, 4222 provide a path for magnetic flux between end magnetic elements 4204, 4206, thereby providing a path for leakage magnetic flux contributing to leakage inductance associated with the N windings 4210. Outer legs 4220, 4222 typically do not include a gap since leakage inductance can be controlled during inductor 4200's design by varying the composition of powder magnetic material forming core 4202. Each of outer legs 4220, 4222 need not necessarily have the same configuration. For example, in certain embodiments, outer leg 4220 has a larger cross sectional area than outer leg 4222, or one of outer legs 4220, 4222 is omitted, so that coupled inductor 4200 has asymmetric leakage inductance properties.

Figure 43:
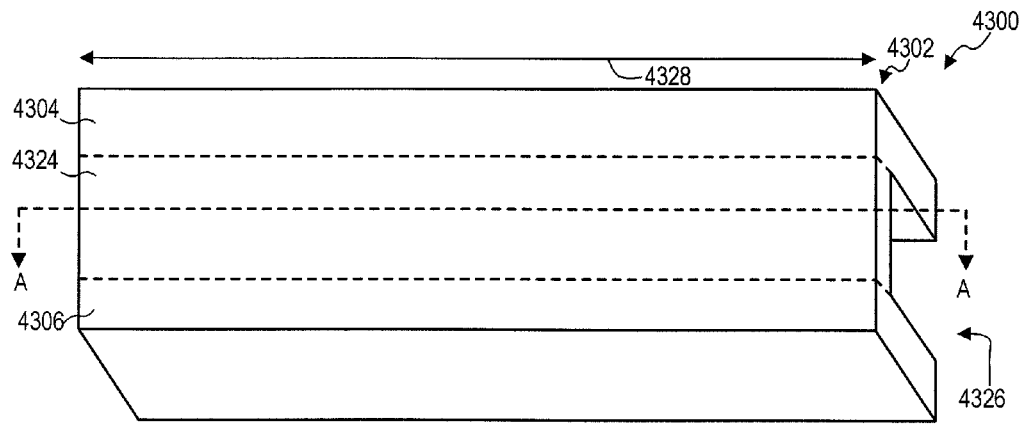
FIGS. 43-46 respectively show a perspective view, a side plan view, a cross sectional view, and a top plan view of a scalable powder magnetic core coupled inductor similar to that of FIGS. 37-39, but further including a top magnetic element, according to an embodiment.
Figure 44:
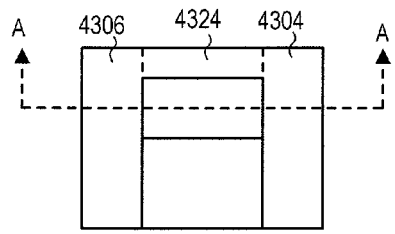
Figure 45:
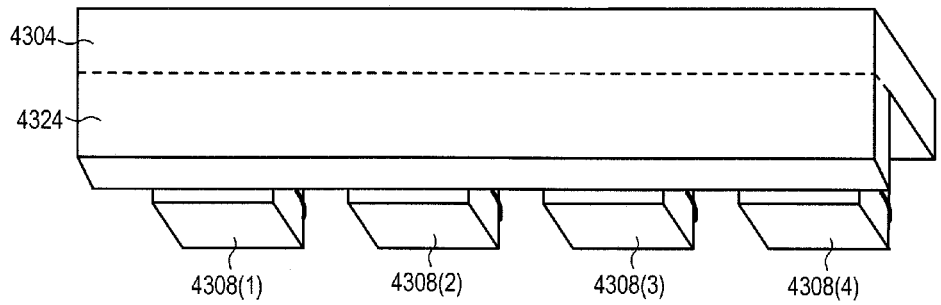
Figure 46:
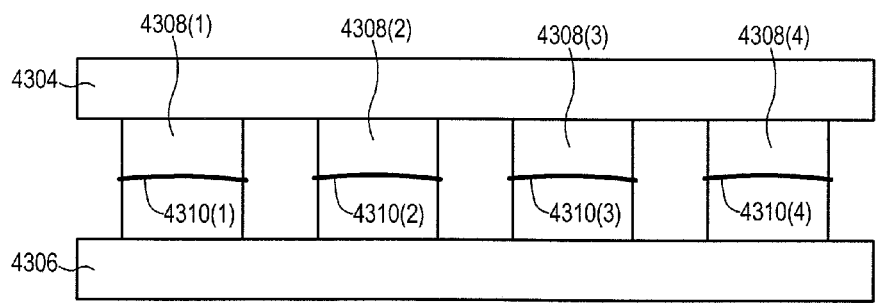

FIG. 43 shows a perspective view of a coupled inductor 4300, which is similar to coupled inductor 3700, but additionally includes a top magnetic 4324. FIG. 44 shows a plan view of side 4326 of coupled inductor 4300, and FIG. 45 shows a cross sectional view taken along line A-A of FIG. 43. FIG. 46 shows a cross-sectional view of coupled inductor 4300 taken along line A-A of FIG. 44.

Coupled inductor 4300 includes a monolithic magnetic core 4302 formed of a powder magnetic material, such as powdered iron within a binder. Core 4302 includes end magnetic elements 4304, 4306, N legs 4308 disposed in a row and connecting end magnetic elements 4304, 4306, where N is an integer greater than one, and top magnetic element 4324. Coupled inductor 4300 further includes N windings 4310, and a respective one of the N windings 4310 is wound at least partially around each leg 4308. In alternate embodiments, windings 4310 are at least partially embedded in legs 4308 and/or are multi-turn windings. Dashed lines of FIGS. 43-45 delineate top magnetic element 4324 from end magnetic elements 4304, 4306 solely to help a viewer identify top magnetic element 4324. The dashed lines and do not represent discontinuities in magnetic core 4302, as core 4302 is a single unit core.

Figure 47:
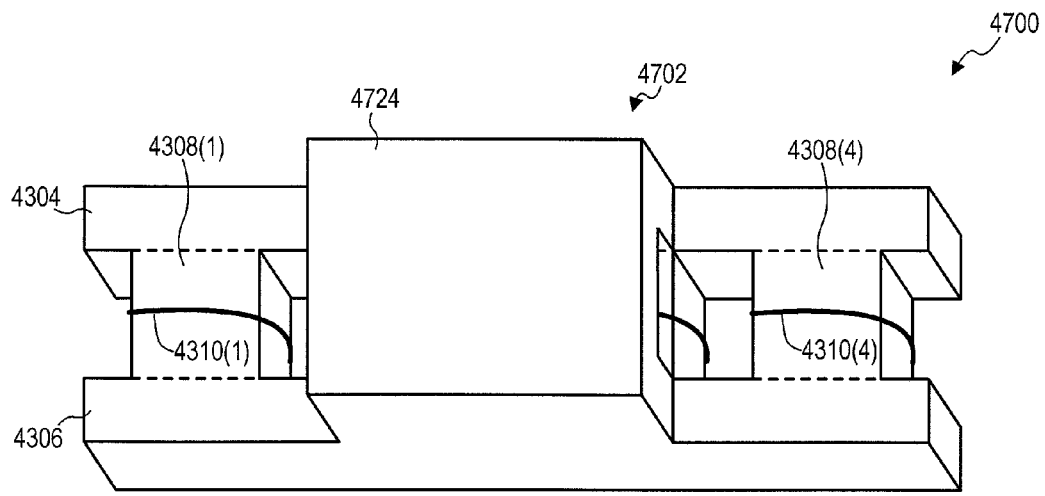
FIG. 47 shows a perspective view of an alternate embodiment of the coupled inductor of FIGS. 43-46.

Top magnetic element 4324 is adjacent to and extends over at least two of legs 4308 and connects end magnetic elements 4304, 4306. Thus, top magnetic element 4324 provides a path for magnetic flux between end magnetic elements 4304, 4306, thereby providing a path for leakage magnetic flux contributing to leakage inductance associated with the N windings 4310. Top magnetic element 4324 typically does not include a gap since leakage inductance can be controlled during inductor 4300's design by varying the composition of powder magnetic material forming core 4302. In alternate embodiments, single top magnetic element 4324 is replaced two or more separate top magnetic elements providing a path for magnetic flux between end magnetic elements 4304, 4306. Top magnetic element 4324's configuration could be varied, such as to extend along only part of length 4328 of coupled inductor 4300. For example, FIG. 47 shows a perspective view of a coupled inductor 4700, which is similar to coupled inductor 4300, but includes a powder magnetic material core 4702 with a top magnetic element 4724 adjacent to and extending over only two of legs 4308.

Figure 48:
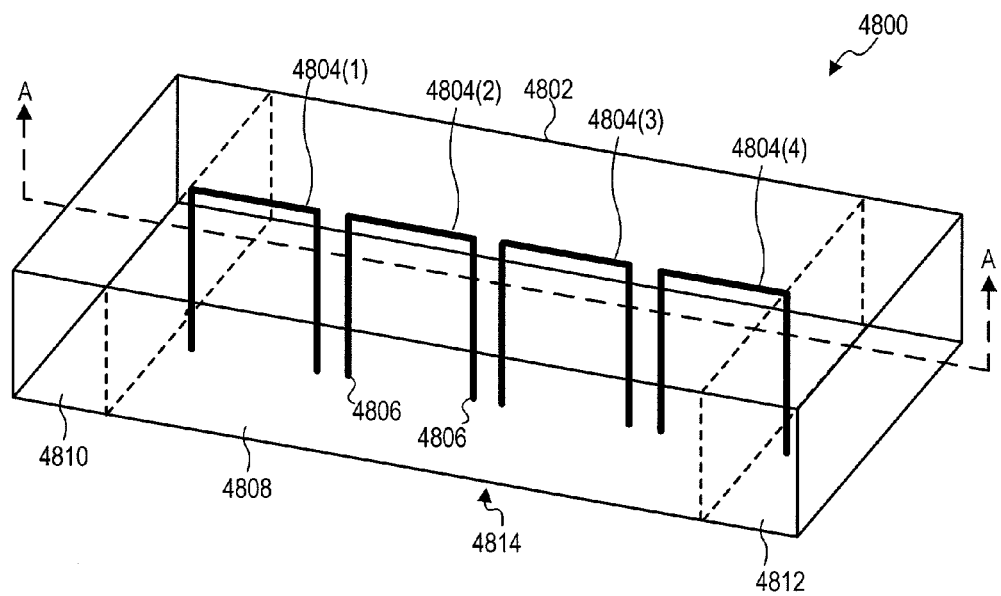
FIG. 48 shows a perspective view of a scalable coupled inductor including a rectangular shaped monolithic magnetic core formed of a powder magnetic material, according to an embodiment.
Figure 49:
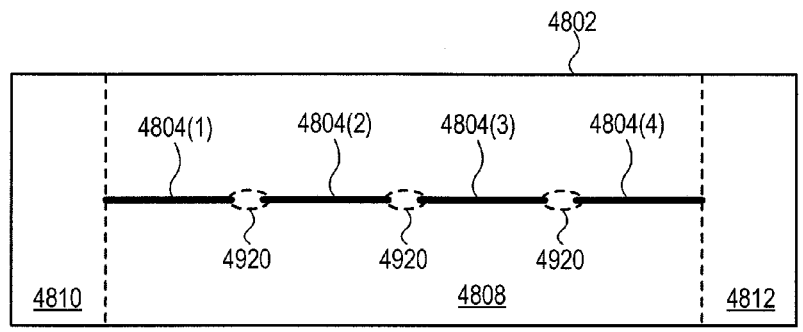
FIG. 49 shows a cross sectional view of the coupled inductor of FIG. 48.

Furthermore, scalable coupled inductors can be formed with powder magnetic material cores lacking visually discernable magnetic core subsections, but nevertheless having magnetic flux paths similar to those of the inductors of FIGS. 37-47. For example, FIG. 48 shows a perspective view of a coupled inductor 4800, which includes a rectangular shaped monolithic magnetic core 4802 formed of a powder magnetic material, such as powdered iron within a binder. FIG. 49 shows a perspective view of coupled inductor 4800 taken along line A-A of FIG. 48. Coupled inductor 4800 further includes N windings 4804, each at least partially embedded in magnetic core 4802, where N is an integer greater than one and is equal to four in the FIG. 48 embodiment. Only the outline of core 4802 is shown in FIG. 48 so that windings 4804 are visible. Each winding 4804 has two ends forming respective terminals 4806, only some of which are labeled to promote illustrative clarity. Windings 4804 optionally include connectors, such as solder tabs or through-hole pins (not shown), at their terminals 4806. Windings 4804 are typically at least partially physically separated from each other in core 4802, and in many embodiments, are completely physically separated from each other.

In contrast to coupled inductor 4200 (FIG. 42), magnetic core 4802 lacks visually discernable magnetic sub elements, such as end magnetic elements, legs, or outer legs, as magnetic core 4802 is a rectangular shaped monolithic magnetic core. Nevertheless, coupled inductor 4800 has magnetic flux paths similar to those of inductor 4200. Magnetic core 4802 can be considered to have at least three functional portions—a center portion 4808 and two outer portions 4810, 4812, shown delineated by dashed lines in FIG. 48. It should be appreciated, however, that the dashed lines in FIGS. 48 and 49 are solely to help the viewer distinguish between functional portions of magnetic core 4802 and do not represent discontinuities in core 4802, as core 4802 is a single unit core. Center portion 4808 of core 4802, which separates outer portions 4810, 4812, magnetically couples windings 4804 and is thus analogous to the end magnetic elements 4204, 4206 and legs 4208 of coupled inductor 4200. Outer portions 4810, 4812, in contrast, provide paths for leakage magnetic flux, which is magnetic flux generated by a given winding 4804 that does not link other windings 4804. Accordingly, outer portions 4810, 4812 are respectively analogous to outer legs 4220, 4222 of inductor 4200. Leakage magnetic flux contributes to leakage inductance associated with the N windings 4804, and as discussed above, leakage inductance must be sufficient large in DC-to-DC converter applications to limit ripple current magnitude. Additionally, sub-portions 4920 of center portion 4808 between windings 4804 also provide paths for leakage magnetic flux, as sub-portions 4920 do not magnetically couple windings 4804. In alternate embodiments, outer portions 4810, 4812 have different configurations, such as different sizes, so that coupled inductor 4800 has asymmetric leakage inductance properties.

Figure 50:
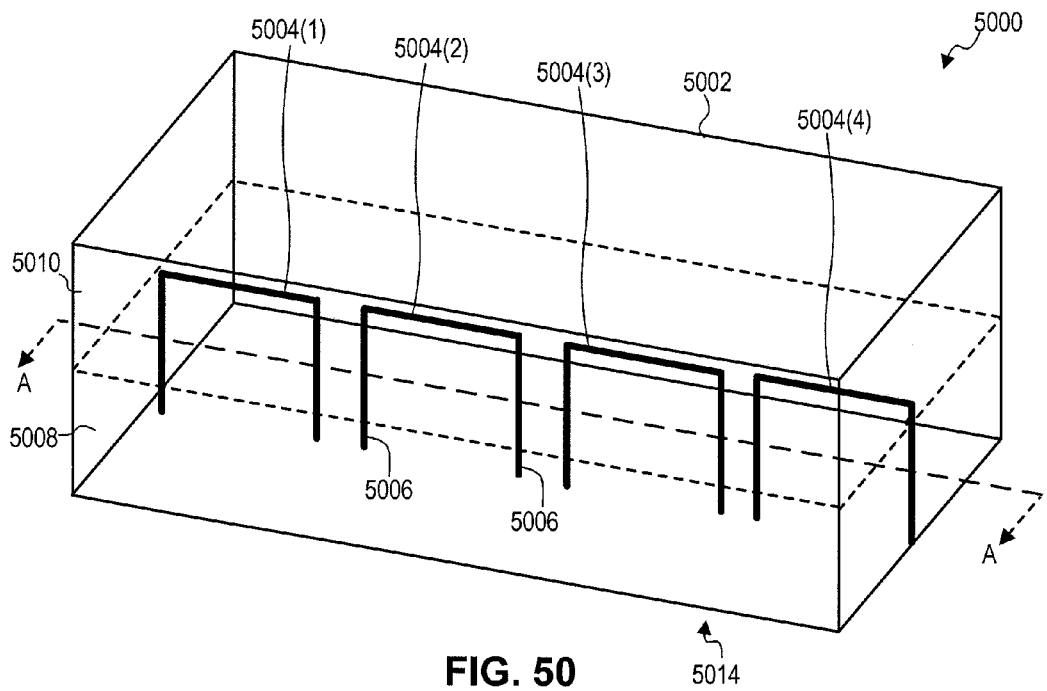
FIG. 50 shows a perspective view of another scalable coupled inductor including a rectangular shaped monolithic magnetic core formed of a powder magnetic material, according to an embodiment.
Figure 51:
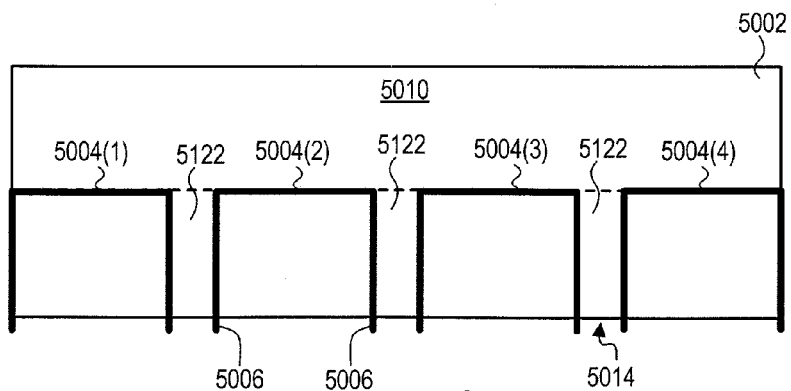
FIG. 51 shows a cross sectional view of the coupled inductor of FIG. 50.

FIG. 50 shows a coupled inductor 5000 which includes a rectangular shaped monolithic magnetic core 5002 formed of a powder magnetic material, such as powdered iron within a binder. FIG. 51 shows a cross sectional view of coupled inductor 5000 taken along line A-A of FIG. 50. Coupled inductor 5000 further includes N windings 5004, each at least partially embedded in magnetic core 5002, where N is an integer greater than one and is equal to four in the FIG. 50 embodiment. Only the outline of core 5002 is shown in FIG. 50 so that windings 5004 are visible. Each winding 5004 has two ends forming respective terminals 5006, only some of which are labeled to promote illustrative clarity. Windings 5004 optionally include connectors, such as solder tabs or through-hole pins (not shown), at their terminals 5006. Windings 5004 are typically at least partially physically separated from each other in core 5002, and in many embodiments, are completely physically separated from each other.

Magnetic core 5002 does not have visually discernable magnetic sub elements since core 5002 is a rectangular shaped monolithic magnetic core. Nevertheless, coupled inductor 5000 has magnetic flux paths similar to those of coupled inductor 5000 (FIG. 43). Magnetic core 5002 can be considered to have at least two functional portions—a bottom portion 5008 and a top portion 5010. Bottom portion 5008 magnetically couples windings 5004 and is thus analogous to end magnetic elements 4304, 4306 and legs 4308 of coupled inductor 4300. Top portion 5010, on the other hand, provides a path of leakage magnetic flux contributing to leakage inductance associated with the N windings 5004. Accordingly, top portion 5010 is analogous to top magnetic element 4324 of coupled inductor 4300. Sub-portions 5122 between windings 5004 in bottom portion 5008 also provide paths for leakage magnetic flux, as such sub-portions do not magnetically couple windings 5004.

It is expected that the magnetic cores of coupled inductors 4800 and 5000 typically will not include discrete gaps since the power magnetic material forming the cores typically has a distributed gap. Nevertheless, one or more of magnetic cores 4802, 5002 can optionally form a discrete gap (e.g., an air gap) to increase inductor energy storage ability. Furthermore, the powder magnetic material forming magnetic cores 4802, 5002 is optionally heterogeneous so that different portions of the core have different magnetic properties. For example, in certain embodiments, outer portions 4810, 4812 of core 4802 have a different magnetic permeability than center portion 4808 to achieve a desired balance between leakage inductance and magnetizing inductance.

Figure 52:
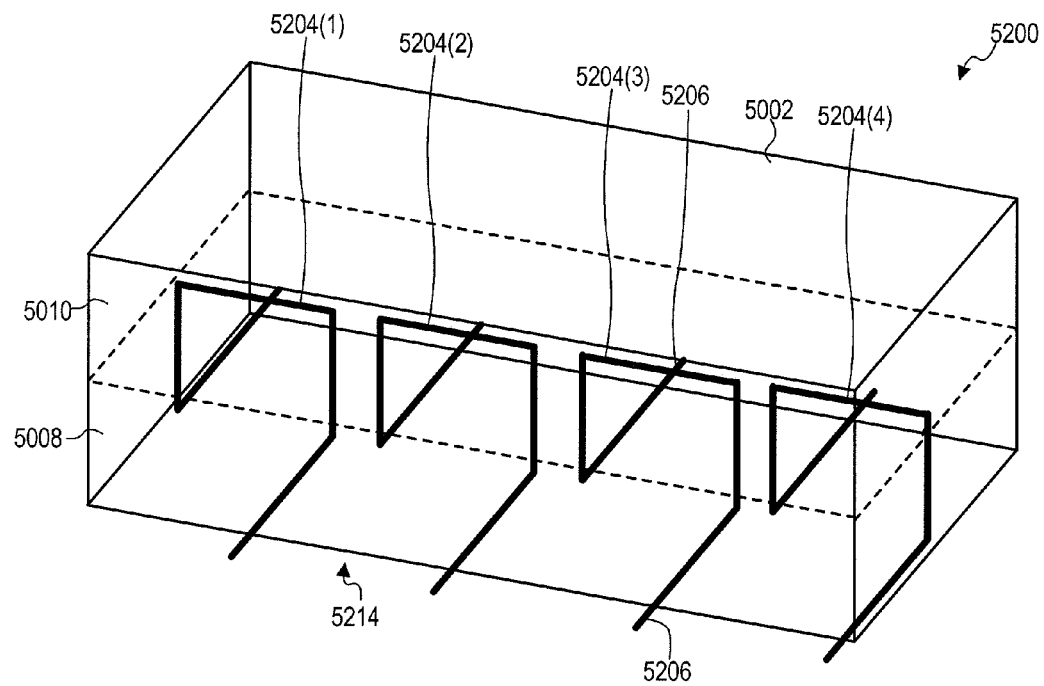
FIG. 52 shows a perspective view of a coupled inductor similar to that of FIG. 50 but with a different winding structure, according to an embodiment.

The configuration of windings 4804, 5004 can be varied. For example, although FIGS. 48 and 50 show windings 4804, 5004 exiting core bottoms 4814, 5014 for through-hole mounting, the windings could be configured to support other connection techniques, such as surface mount soldering. For example, FIG. 52 shows a coupled inductor 5200, which is similar to coupled inductor 5000, but includes windings 5204 with terminals 5206 extending along a bottom core surface 5214 to support surface mount soldering. Only some of terminals 5206 are labeled to promote illustrative clarity. In alternate embodiments, windings 4804, 5004 are multi-turn windings, such as shown in FIG. 53, which shows a coupled inductor 5300 having two-turn windings 5304. Coupled inductor 5300 is otherwise similar to coupled inductor 5000.

Windings of coupled inductors 4800, 5000 are, for example, windings having circular cross section, square cross section, or rectangular cross section. For example, FIG. 54 shows a coupled inductor 5400, which is similar to coupled inductor 5000, but includes foil windings 5404 forming solder tabs 5416 for surface mount soldering to a printed circuit board. Only some of solder tabs 5416 are labeled for illustrative clarity.

The cores of the inductor of FIGS. 48-54 alternately have shapes other than rectangular. For example, core edges may be rounded and/or outer surfaces may be non-planar.

The coupled inductors of FIGS. 48-54 may be simpler and/or more economical to manufacture than conventional scalable coupled inductors. For example, as discussed above with respect to FIG. 35, certain embodiments of the coupled inductors of FIGS. 48-54 may be manufactured by a relatively simple process including placing windings in a mold, disposing powder magnetic material in the mold, and curing a binder of the powder magnetic material. Conventional scalable coupled inductors, in contrast, are typically manufactured by a more complicated process including manufacturing a complex shaped magnetic core and then installing windings on the complex shaped magnetic core. Conventional scalable coupled inductors generally require a complex shaped magnetic core to provide the necessary magnetic coupling between multiple windings, while the coupled inductors of FIGS. 48-54 achieve the necessary magnetic coupling between windings with a single unit magnetic core.

Combinations of Features

Features described above as well as those claimed below may be combined in various ways without departing from the scope hereof. The following examples illustrate some possible combinations:

(a1) A coupled inductor may include: a monolithic magnetic core formed of a powder magnetic material and including first and second end magnetic elements and N legs connecting the first and second end magnetic elements, N being an integer greater than one; and N windings, each winding wound around a respective one of the N legs.

(a2) In the coupled inductor denoted as (a1), the powder magnetic material may include a magnetic material within a polymeric binder.

(a3) In the coupled inductors denoted as (a1) or (a2), the magnetic material may include powdered iron.

(a4) In any of the coupled inductors denoted as (a1) through (a3), each of the N windings may be embedded in a respective one of the N legs.

(a5) In any of the coupled inductors denoted as (a1) through (a4), each of the N windings may be a multi-turn winding.

(a6) In any of the coupled inductors denoted as (a1) through (a5), the monolithic magnetic core may further include first and second outer legs connected to the first and second end magnetic elements and providing paths for magnetic flux between the first and second end magnetic elements, where the N legs are disposed in a row between the first and second outer legs.

(a7) In any of the coupled inductors denoted as (a1) through (a6), the monolithic magnetic core may further include a top magnetic element adjacent to and extending over at least two of the N legs to provide a path for magnetic flux between the first and second end magnetic elements.

(a8) In any of the coupled inductors denoted as (a7), the top magnetic element may be adjacent to and extend over each of the N legs.

(b1) A power supply may include a coupled inductor and N switching circuits, where N is an integer greater than one. The coupled inductor may include N windings and a monolithic magnetic core formed of a powder magnetic material. The monolithic magnetic core may include first and second end magnetic elements and N legs connecting the first and second end magnetic elements. Each of the N windings may be wound around a respective one of the N legs. Each of the N switching circuits may be for switching a second end of a respective one of the N windings between at least two different voltage levels at a frequency of at least 20 kilohertz.

(b2) In the power supply denoted as ( )), the powder magnetic material may include a magnetic material within a polymeric binder.

(b3) In the power supplies denoted as (b1) or (b2), the magnetic material may include powdered iron.

(b4) In any of the power supplies denoted as (b1) through (b3), each of the N windings may be embedded in a respective one of the N legs.

(b5) In any of the power supplies denoted as (b1) through (b4), each of the N windings may be a multi-turn winding.

(b6) In any of the power supplies denoted as (b1) through (b5), the monolithic magnetic core may further include first and second outer legs connected to the first and second end magnetic elements and providing paths for magnetic flux between the first and second end magnetic elements, where the N legs are disposed in a row between the first and second outer legs.

(b7) In any of the power supplies denoted as (b1) through (b6), the monolithic magnetic core may further include a top magnetic element adjacent to and extending over at least two of the N legs to provide a path for magnetic flux between the first and second end magnetic elements.

(b8) In any of the power supplies denoted as (b7), the top magnetic element may be adjacent to and extend over each of the N legs.

(c1) A coupled inductor may include: a monolithic magnetic core formed of a powder magnetic material; and N windings each at least partially embedded in the monolithic magnetic core, the N windings being at least partially physically separated from each other in the monolithic magnetic core, the monolithic magnetic core magnetically coupling the N windings and providing a path for leakage magnetic flux contributing to leakage inductance associated with the N windings, N being an integer greater than one.

(c2) In the coupled inductor denoted as (c1), the powder magnetic material may include a magnetic material within a polymeric binder.

(c3) In the coupled inductors denoted as (c1) or (c2), the magnetic material may include powdered iron.

(c4) In any of the coupled inductors denoted as (c1) through (c3), each of the N windings may be a multi-turn winding.

(c5) In any of the coupled inductors denoted as (c1) through (c4), each of the N windings may be electrically isolated from the other N windings in the monolithic magnetic core.

(c6) In any of the coupled inductors denoted as (c1) through (c5), a first portion of the monolithic magnetic core may magnetically couple the N windings, and a second portion of the monolithic magnetic core may provide at least part of the path for leakage magnetic flux, where the first portion is different from the second portion.

(c7) In any of the coupled inductors denoted as (c6), the first portion may have different magnetic properties than the second portion.

(c8) In any of the coupled inductors denoted as (c6) or (c7), a third portion of the monolithic magnetic core may provide another part of the path for leakage magnetic flux, where the first portion separates the second and third portions.

(d1) A power supply may include: a coupled inductor, including: a monolithic magnetic core formed of a powder magnetic material, and N windings each at least partially embedded in the monolithic magnetic core, the N windings being at least partially physically separated from each other in the monolithic magnetic core, the monolithic magnetic core magnetically coupling the N windings and providing a path for leakage magnetic flux contributing to leakage inductance associated with the N windings, each winding having a first end electrically coupled to a common node, N being an integer greater than one; and N switching circuits, each for switching a second end of a respective one of the N windings between at least two different voltage levels at a frequency of at least 20 kilohertz.

(d2) In the power supply denoted as (d1) the powder magnetic material may include a magnetic material within a polymeric binder.

(d3) In the power supplies denoted as (d1) or (d2), the magnetic material may include powdered iron.

(d4) In any of the power supplies denoted as (d1) through (d3), each of the N windings may be a multi-turn winding.

(d5) In any of the power supplies denoted as (d1) through (d4), each of the N windings may be electrically isolated from the other N windings in the monolithic magnetic core.

(d6) In any of the power supplies denoted as (d1) through (d5), a first portion of the monolithic magnetic core may magnetically couple the N windings, and a second portion of the monolithic magnetic core may provide at least part of the path for leakage magnetic flux, where the first portion is different from the second portion.

Changes may be made in the above methods and systems without departing from the scope hereof. For example, although the above examples of coupled inductors generally show a rectangular shaped core, core shape could be varied. As another example, the number of windings per inductor and/or the number of turns per winding could be varied. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A coupled inductor, comprising:
   a monolithic magnetic core formed of a powder magnetic material, the monolithic magnetic core having length, width, and height; and
   N windings, N being an integer greater than one;
   wherein:
      each of the N windings forms an integer number of turns embedded in the monolithic magnetic core, each turn having an u-shape within the monolithic magnetic core as seen when looking cross-sectionally in the widthwise direction,
      the turns of each of the N windings are non-overlapping with the turns of each other of the N windings, as seen when looking cross-sectionally in the widthwise direction,
      the monolithic magnetic core includes a leakage path portion extending in the length by width directions over the turns of each of the N windings, and
      the leakage path portion is non-overlapping with the turns of each of the N windings, as seen when looking cross-sectionally in the widthwise direction.

2. The coupled inductor of claim 1, wherein the powder magnetic material comprises a magnetic material within a polymeric binder.

3. The coupled inductor of claim 2, wherein the magnetic material comprises powdered iron.

4. The coupled inductor of claim 1, each of the N windings being a multi-turn winding.

5. The coupled inductor of claim 1, each of the N windings being electrically isolated from the other N windings in the monolithic magnetic core.

6. The coupled inductor of claim 1, the leakage path portion extending along the entire length and width of the monolithic magnetic core.

7. The coupled inductor of claim 6, the monolithic magnetic core further including a magnetic coupling portion adjoining the leakage path portion in the heightwise direction, the turns of the N windings being disposed in the magnetic coupling portion, but not in the leakage path portion.

8. The coupled inductor of claim 7, the magnetic coupling portion of the monolithic magnetic core magnetically coupling the N windings, and the leakage path portion of the monolithic magnetic core providing at least part of a path for leakage magnetic flux.

9. The coupled inductor of claim 8, the magnetic coupling portion having different magnetic properties than the leakage path portion.

10. The coupled inductor of claim 8, the monolithic magnetic core having opposing first and second outer surfaces separated from each other in the widthwise direction, the turns of each of the N windings being separated, in the widthwise direction, from each of the first and second outer surfaces.

11. The coupled inductor of claim 1, the monolithic magnetic core including an outer surface extending in the length by width directions, each of the N windings forming two terminals along the outer surface of the monolithic magnetic core.

12. The coupled inductor of claim 1, wherein:
the monolithic magnetic core has opposing first and second outer surfaces separated from each other in the widthwise direction;
opposing ends of each of the N windings form first and second terminals, respectively;
each first terminal extends towards the first outer surface; and
each second terminal extends toward the second outer surface.

13. The coupled inductor of claim 12, each first terminal non-overlapping with each second terminal, as seen when looking in the lengthwise direction.

14. A power supply, comprising:
a coupled inductor, including:
a monolithic magnetic core formed of a powder magnetic material, the monolithic magnetic core having length, width, and height, and
N windings, each of the N windings having a first end electrically coupled to a common node, N being an integer greater than one,
wherein:
each of the N windings forms an integer number of turns embedded in the monolithic magnetic core, each turn having an u-shape within the monolithic magnetic core as seen when looking cross-sectionally in the widthwise direction,
the turns of each of the N windings are-non-overlapping with the turns of each other of the N windings, as seen when looking cross-sectionally in the widthwise direction,
the monolithic magnetic core includes a leakage path portion extending in the length by width directions over the turns of each of the N windings, and
the leakage path portion is non-overlapping with the turns of each of the N windings, as seen when looking cross-sectionally in the widthwise direction; and
N switching circuits, each for switching a second end of a respective one of the N windings between at least two different voltage levels at a frequency of at least 20 kilohertz.

15. The power supply of claim 14, wherein the powder magnetic material comprises a magnetic material within a polymeric binder.

16. The power supply of claim 15, wherein the magnetic material comprises powdered iron.

17. The power supply of claim 14, each of the N windings being a multi-turn winding.

18. The power supply of claim 14, each of the N windings being electrically isolated from the other N windings in the monolithic magnetic core.

19. The power supply of claim 14, the leakage path portion extending along the entire length and width of the monolithic magnetic core.

20. The power supply of claim 19, the monolithic magnetic core further including a magnetic coupling portion adjoining the leakage path portion in the heightwise direction, the turns of the N windings being disposed in the magnetic coupling portion, but not in the leakage path portion.

21. The power supply of claim 20, the magnetic coupling portion of the monolithic magnetic core magnetically coupling the N windings, and the leakage path portion of the monolithic magnetic core providing at least part of a path for leakage magnetic flux.

22. The power supply of claim 21, the monolithic magnetic core having opposing first and second outer surfaces separated from each other in the widthwise direction, the turns of each of the N windings being separated, in the widthwise direction, from each of the first and second outer surfaces.

23. The power supply of claim 14, wherein:
the monolithic magnetic core has opposing first and second outer surfaces separated from each other in the widthwise direction;
the first end of each of the N windings extends towards the first outer surface; and
the second end of each of the N windings extends toward the second outer surface.

* * * * *

UNITED STATES PATENT AND TRADEMARK OFFICE
CERTIFICATE OF CORRECTION

PATENT NO. : 8,952,776 B2
APPLICATION NO. : 13/107616
DATED : February 10, 2015
INVENTOR(S) : Alexandr Ikriannikov It is certified that error appears in the above-identified patent and that said Letters Patent is hereby corrected as shown below:

On the title page,
Item 57, Abstract, line 7, "winding electrically is" should read -- winding is electrically --;
In the specification,
Column 5, line 6, "It the following" should read -- In the following --;
Column 5, line 37, "be in form of" should read -- be in the form of --;
Column 6, line 37, "such at it has" should read -- such that it has --;
Column 11, line 40, "will the magnetizing" should read -- will be the magnetizing --;
Column 12, line 3, "2504, 5506" should read -- 2504, 2506 --;
Column 12, line 39, "will the magnetizing" should read -- will be the magnetizing --;
Column 13, line 44, "turns or not turns" should read -- turns or no turns --;
Column 14, line 56 and 57, "magnetic material magnetic cores" should read -- magnetic material cores --;
Column 18, line 5, "may facilitated forming" should read -- may facilitate forming --;
Column 18, line 58, "4220, 422" should read -- 4220, 4222 --;
Column 19, line 36, "lines and do not" should read -- lines do not --;
Column 19, line 49, "is replaced" should read -- is replaced by --;
Column 20, line 38, "be sufficient large" should read -- be sufficiently large --;
Column 22, line 35, "In any of the coupled inductors" should read -- In the coupled inductor --;
Column 22, line 49, "denoted as ( ))" should read -- denoted as (b1)) --;
Column 23, line 4, "In any of the power supplies" should read -- In the power supply --;
Column 23, line 8, "material; and N" should read -- material, and N --;
Column 23, line 34, "In any of the coupled inductors" should read -- In the coupled inductor --;
Column 23, line 51, "one; and N" should read -- one, and N --;
In the claims,
Column 25, Line 38 and 39, "are-non-overlapping" should read -- are non-overlapping --.

Signed and Sealed this
First Day of March, 2016

Michelle K. Lee
*Director of the United States Patent and Trademark Office*